(12) United States Patent
Tsai et al.

(10) Patent No.: US 8,902,873 B2
(45) Date of Patent: Dec. 2, 2014

(54) EFFICIENT SIGNALING FOR CLOSED-LOOP TRANSMIT DIVERSITY

(75) Inventors: Ming-Chang Tsai, San Diego, CA (US); Ann Tsuey Jiuan Wu, San Diego, CA (US); Hailiang Cai, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1150 days.

(21) Appl. No.: 12/575,936

(22) Filed: Oct. 8, 2009

(65) Prior Publication Data

US 2011/0085537 A1      Apr. 14, 2011

(51) Int. Cl.
*H04B 7/216* (2006.01)
*H04B 7/06* (2006.01)

(52) U.S. Cl.
CPC ............ *H04B 7/0619* (2013.01); *H04B 7/0636* (2013.01)
USPC ........................................................ 370/342

(58) Field of Classification Search
CPC .............................. H04B 7/0636; H04B 7/0619
USPC ......................................................... 370/342
See application file for complete search history.

(56) References Cited

U.S. PATENT DOCUMENTS

| | | | |
|---|---|---|---|
| 5,406,279 A | | 4/1995 | Anderson et al. |
| 6,201,499 B1 * | | 3/2001 | Hawkes et al. ................ 342/387 |
| 7,079,052 B2 * | | 7/2006 | Lamy et al. ...................... 341/67 |
| 7,139,966 B2 * | | 11/2006 | Litwin et al. ................... 714/776 |
| 7,515,714 B2 * | | 4/2009 | Orihashi et al. ............. 380/255 |
| 8,170,617 B2 * | | 5/2012 | Nassiri-Toussi et al. .. 455/562.1 |
| 2003/0148770 A1 * | | 8/2003 | Das et al. ....................... 455/455 |
| 2005/0085236 A1 | | 4/2005 | Gerlach et al. |
| 2005/0089117 A1 * | | 4/2005 | Harron et al. ................. 375/298 |
| 2005/0180500 A1 * | | 8/2005 | Chiang et al. ................. 375/240 |
| 2006/0159195 A1 * | | 7/2006 | Ionescu et al. ................ 375/267 |
| 2007/0115909 A1 * | | 5/2007 | Wang et al. .................... 370/342 |
| 2008/0031314 A1 * | | 2/2008 | Priotti et al. ................... 375/227 |
| 2008/0077413 A1 * | | 3/2008 | Eguchi .......................... 704/500 |
| 2009/0316610 A1 * | | 12/2009 | Yellin et al. .................... 370/281 |
| 2010/0202565 A1 * | | 8/2010 | Abbasfar ....................... 375/308 |
| 2011/0092241 A1 * | | 4/2011 | Kawai et al. .................. 455/509 |

FOREIGN PATENT DOCUMENTS

| | | |
|---|---|---|
| FR | 2128360 A1 | 10/1972 |
| GB | 2324668 A | 10/1998 |
| JP | H1155128 A | 2/1999 |
| JP | 2004515096 A | 5/2004 |

(Continued)

OTHER PUBLICATIONS

International Search Report and Written Opinion—PCT/US2010/052096, ISA/EPO—Jul. 4, 2011.
Ericsson et al., "Improvements of closed loop TX diversity description", 3GPP TSG-RAN WG1#21, R1-01-0837, Aug. 27-31, 2001, pp. 1-13.

(Continued)

*Primary Examiner* — Luat Phung
*Assistant Examiner* — Saad A Waqas
(74) *Attorney, Agent, or Firm* — Darren M. Simon

(57) ABSTRACT

Techniques for encoding a phase adjustment for a feedback signal in a closed-loop transmit diversity system. In an aspect, codewords for the phase adjustments are chosen according to a variable-length prefix code. The prefix code aspect allows the codewords to be transmitted in sequence on the feedback channel without being separated by "commas" or demarcation symbols. The variable-length aspect provides a variety of coarse and fine phase adjustment quantization step sizes to accommodate multiple different channel scenarios. In an aspect, the length of the codewords may be further optimized according to the Huffman encoding algorithm.

25 Claims, 17 Drawing Sheets

(56) References Cited

FOREIGN PATENT DOCUMENTS

| | | |
|---|---|---|
| JP | 2005130491 A | 5/2005 |
| WO | 0115457 A2 | 3/2001 |
| WO | 0237687 A2 | 5/2002 |

OTHER PUBLICATIONS

Nokia: "Proposal to simplify the Tx diversity closed loop modes", 3GPP TSG-RAN WG1#6, R1-99945, Jul. 13-16, 1999, pp. 1-18.

* cited by examiner

| Codeword | Signaled parameter |
|---|---|
| A | 0° |
| B | 72° IF MODE=0 |
|   | 20° IF MODE=1 |
| C | 144° IF MODE=0 |
|   | 40° IF MODE=1 |
| D | 216° IF MODE=0 |
|   | 320° IF MODE=1 |
| E | 288° IF MODE=0 |
|   | 340° IF MODE=1 |
| F | MODE=0 |
| G | MODE=1 |

FIG 8

EFFICIENT SIGNALING FOR CLOSED-LOOP TRANSMIT DIVERSITY

TECHNICAL FIELD

The present invention relates generally to wireless communications, and more specifically, to techniques for efficient signaling of closed-loop transmit diversity parameters.

BACKGROUND

Wireless communication systems are widely deployed to provide various types of communication such as voice, packet data, and so on. These systems may be based on code division multiple access (CDMA), time division multiple access (TDMA), frequency division multiple access (FDMA), or other multiple access techniques. Such systems can conform to standards such as Third-Generation Partnership Project 2 (3gpp2, or "cdma2000"), Third-Generation Partnership (3gpp, or "W-CDMA"), or Long Term Evolution ("LTE"). In the design of such communications systems, it is desirable to maximize the capacity, or the number of users the system can reliably support, given the available resources.

One technique used to enhance performance, including system capacity and data throughput, is to lower the required transmit signal power by employing transmit diversity. Transmit diversity involves transmitting data on two or more antennas, where the geographical separation between the antennas leads to path loss characteristics that are independent from antenna to antenna. A receiving station can coherently combine signals from the transmit diversity antennas, and the noise introduced in the channel will not combine coherently, thus increasing the signal-to-noise ratio (SNR) received.

In some closed-loop transmit diversity schemes, an example of which is proposed in the aforementioned W-CDMA specification, a mobile station sends phase adjustment information to the base station to adjust the phase of the signals being transmitted on one or more antennas. The phase can be adjusted such that when the signals from the various transmit antennas are received at the mobile station, they combine coherently. To signal the phase adjustment information to the base station, the mobile station may encode the information using a code, such as a two-bit code that uniformly quantizes the 360° range of possible phase adjustments into four levels. While such coding techniques may be simple to design and implement, they may inefficiently use the over-the-air signaling resources under certain channel conditions, e.g., static or quasi-static channel conditions, wherein any phase adjustments are expected to vary slowly over time.

It would be desirable to provide simple and efficient techniques for encoding the phase adjustment information sent on a feedback channel for closed-loop transmit diversity and other system employing feedback signaling.

SUMMARY

An aspect of the present disclosure provides an apparatus for transmitting information on a feedback channel, the apparatus comprising: a receiver configured to receive a signal on a primary channel; an update calculation module configured to determine an adjustment to be applied on the primary channel based on the received signal; an encode module configured to encode the adjustment to be applied using a variable-length prefix code; and a transmitter configured to transmit the encoded adjustment on the feedback channel.

Another aspect of the present disclosure provides an apparatus for receiving information on a feedback channel, the apparatus comprising: a transmitter configured to transmit first and second signals using first and second antennas, respectively, on a primary channel, the first and second signals having a relative phase difference; a receiver configured to receive an encoded phase adjustment signal on a feedback channel; a phase decode module configured to decode the encoded phase adjustment signal using a variable-length prefix code; and a phase control module configured to adjust the relative phase difference based on the decoded phase adjustment signal.

Yet another aspect of the present disclosure provides a method for transmitting information on a feedback channel, the method comprising: receiving a signal on a primary channel; determining an adjustment to be applied on the primary channel based on the received signal; encoding the adjustment to be applied using a variable-length prefix code; and transmitting the encoded adjustment on the feedback channel.

Yet another aspect of the present disclosure provides a method for receiving information on a feedback channel, the method comprising: transmitting first and second signals using first and second antennas, respectively, on a primary channel, the first and second signals having a relative phase difference; receiving an encoded phase adjustment signal on a feedback channel; decoding the encoded phase adjustment signal using a variable-length prefix code; and adjusting the relative phase difference based on the decoded phase adjustment signal.

Yet another aspect of the present disclosure provides an apparatus for transmitting information on a feedback channel, the apparatus comprising: means for receiving a signal on a primary channel; means for determining an adjustment to be applied on the primary channel based on the received signal; means for encoding the adjustment to be applied; and means for transmitting the encoded adjustment on the feedback channel.

Yet another aspect of the present disclosure provides a computer program product for transmitting information on a feedback channel, the product comprising: computer-readable medium comprising: code for causing a computer to receive a signal on a primary channel; code for causing a computer to determine an adjustment to be applied on the primary channel based on the received signal; code for causing a computer to encode the adjustment to be applied using a variable-length prefix code; and code for causing a computer to transmit the encoded adjustment on the feedback channel.

BRIEF DESCRIPTION OF DRAWINGS

FIG. 8 illustrates an exemplary embodiment of a signaling scheme wherein the specific phase adjustment corresponding to codewords B, C, D, and E depend on the value of a signaled mode parameter, and the mode parameter itself is signaled using codewords F and G.

DETAILED DESCRIPTION

The detailed description set forth below in connection with the appended drawings is intended as a description of exemplary embodiments of the present invention and is not intended to represent the only exemplary embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well known structures and devices are shown in block diagram form in order to avoid obscuring the novelty of the exemplary embodiments presented herein.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Figure 1:
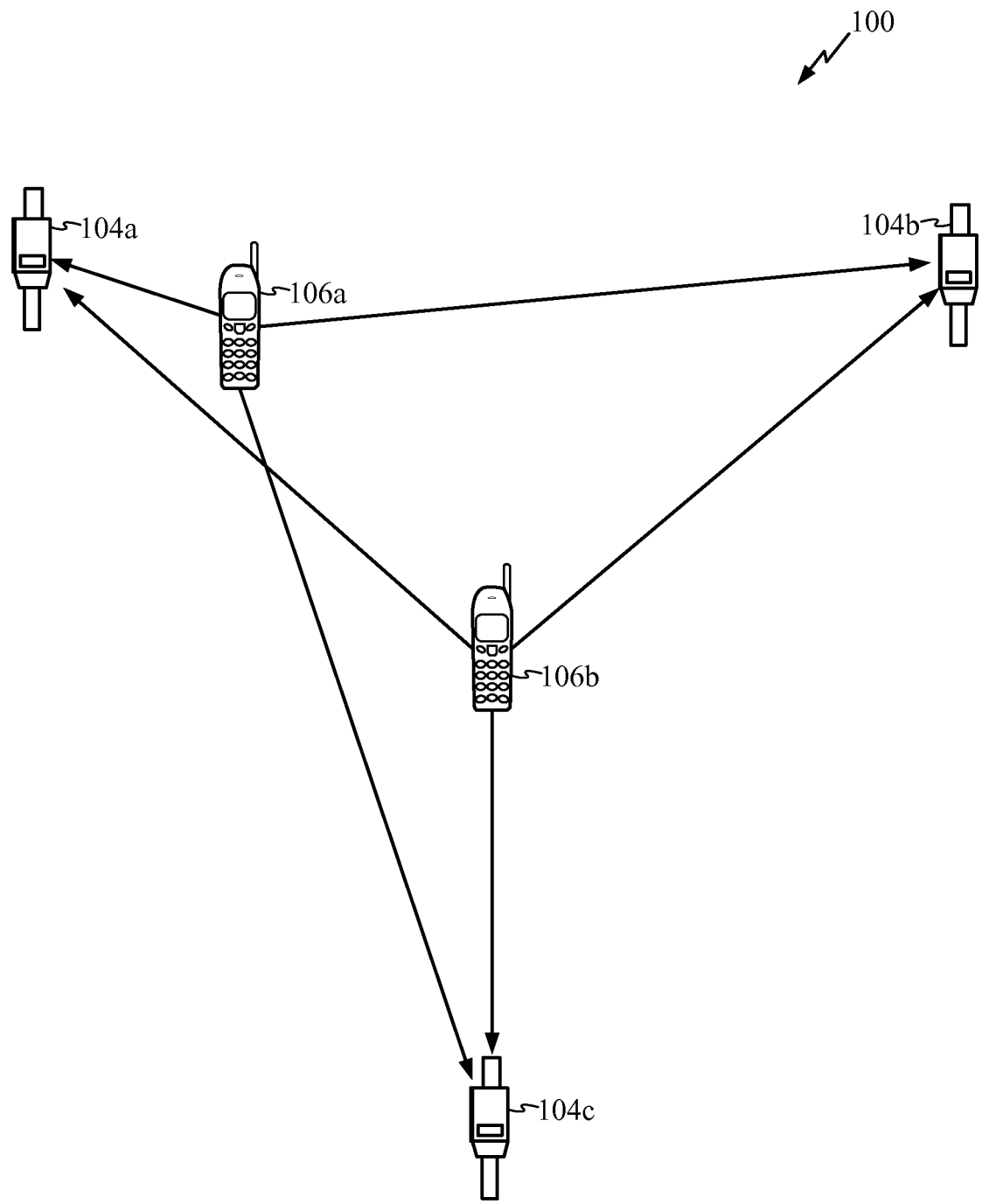
FIG. 1 is a diagram of a wireless communication system that may be designed to support one or more CDMA standards and/or designs.

FIG. 1 is a diagram of a wireless communication system 100 that may be designed to support one or more CDMA standards and/or designs (e.g., the W-CDMA standard, the IS-95 standard, the cdma2000 standard, the HDR specification). For simplicity, system 100 is shown to include three base stations 104 in communication with two mobile stations 106. The base station and its coverage area are often collectively referred to as a "cell." In IS-95 systems, a cell may include one or more sectors. In the W-CDMA specification, each sector of a base station and the sector's coverage area is referred to as a cell. As used herein, the term base station can be used interchangeably with the terms access point or NodeB. The term mobile station can be used interchangeably with the terms user equipment (UE), subscriber unit, subscriber station, access terminal, remote terminal, or other corresponding terms known in the art. The term mobile station encompasses fixed wireless applications.

Depending on the CDMA system being implemented, each mobile station 106 may communicate with one (or possibly more) base stations 104 on the forward link at any given moment, and may also communicate with one or more base stations 104 on the reverse link depending on whether or not the mobile station is in soft handoff. The forward link (i.e., downlink) refers to transmission from the base station to the mobile station, and the reverse link (i.e., uplink) refers to transmission from the mobile station to the base station.

Figure 2:
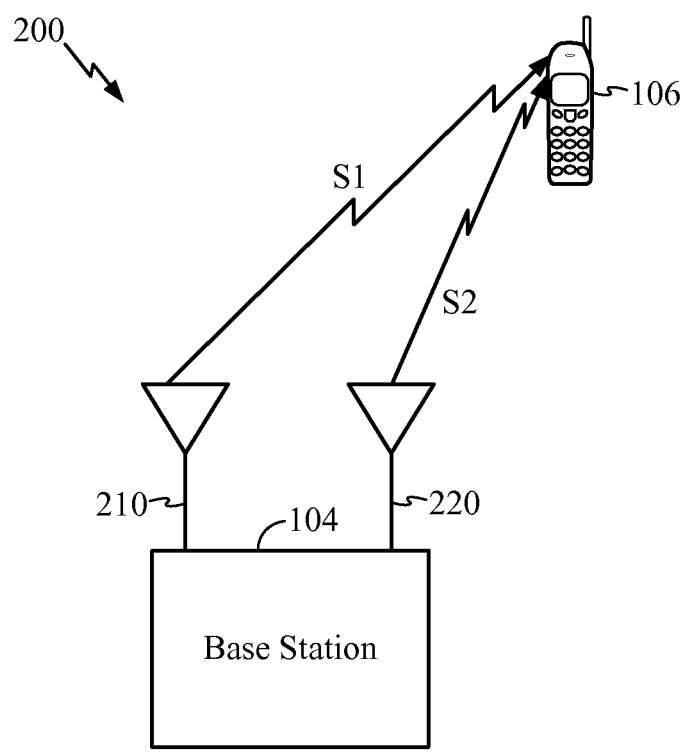
FIG. 2 shows an embodiment of a system detailing a transmit diversity scheme.

FIG. 2 shows an embodiment of a system 200 detailing a transmit diversity scheme. Base station 104 is equipped with two antennas, 210 and 220, for communicating with mobile station 106. (Alternative embodiments may use more than two antennas.) The links between antennas 210 and 220 and mobile station 106 are labeled S1 and S2, respectively. The two antennas are located with enough geographical separation that the fading experienced on S1 is independent from the fading on S2, yet the two signals arrive at mobile station 106 at essentially the same time. Various techniques can be employed such that the two signals combine constructively at the mobile station, and in so doing combat some of the deleterious effects that would be introduced if only a single antenna were deployed.

One such scheme, detailed in the above referenced W-CDMA standard, is closed-loop transmit diversity. The phase of a signal, S2, transmitted on a second antenna 220 is adjusted in relation to the signal, S1, transmitted on a first antenna 210 so that the two signals, S1 and S2, are in-phase and maximally combine when received at mobile station 106. Those of skill in the art will recognize that phase adjustment can take place on either the first or the second antenna, on both antennas, or on even more antennas in systems employing more than two antennas.

The adjustment introduced on the second antenna is determined at the mobile station 106 and transmitted to the base station 104. Due to discrete quantization of the 360° range of possible phase adjustments, only a finite number of increments will be supported for adjustment of the second antenna. As such, in some cases, S1 and S2 will not arrive exactly in phase at the mobile station. Instead, the phase adjustment is made such that S1 and S2 coherently combine to maximize the signal-to-noise ratio (SNR), out of the available adjustments, received at mobile station 106.

The mobile station 106 determines the phase adjustment for the next time period by measuring the signals, S1 and S2, received in the current time period. The phase adjustment is transmitted on the reverse link and received by the base station 104.

In FIG. 2, the transmissions from the base station 104 to the mobile station 106 on S1 and S2 are denoted as a primary channel, as distinguished from the feedback channel from the mobile station 106 to the base station 104. One of ordinary skill in the art will appreciate that in alternative exemplary embodiments, the primary channel need not be from a base station 104 to a mobile station 106. One of ordinary skill in the art will appreciate that the techniques disclosed herein may be readily applied to alternative exemplary embodiments wherein the primary channel instead corresponds to the reverse link, and the feedback channel corresponds to the forward link. It will also be appreciated that while exemplary embodiments are described herein with reference to a base station employing transmit diversity, the techniques described may readily be applied to systems wherein a mobile station employs transmit diversity, in lieu of or in conjunction with transmit diversity at the base station. The primary channel may generally encompass any feed-forward channel from one communications entity to another, whose parameters may be adjusted by information sent on a feedback channel. Such alternative exemplary embodiments are contemplated to be within the scope of the present disclosure.

Figure 2A:
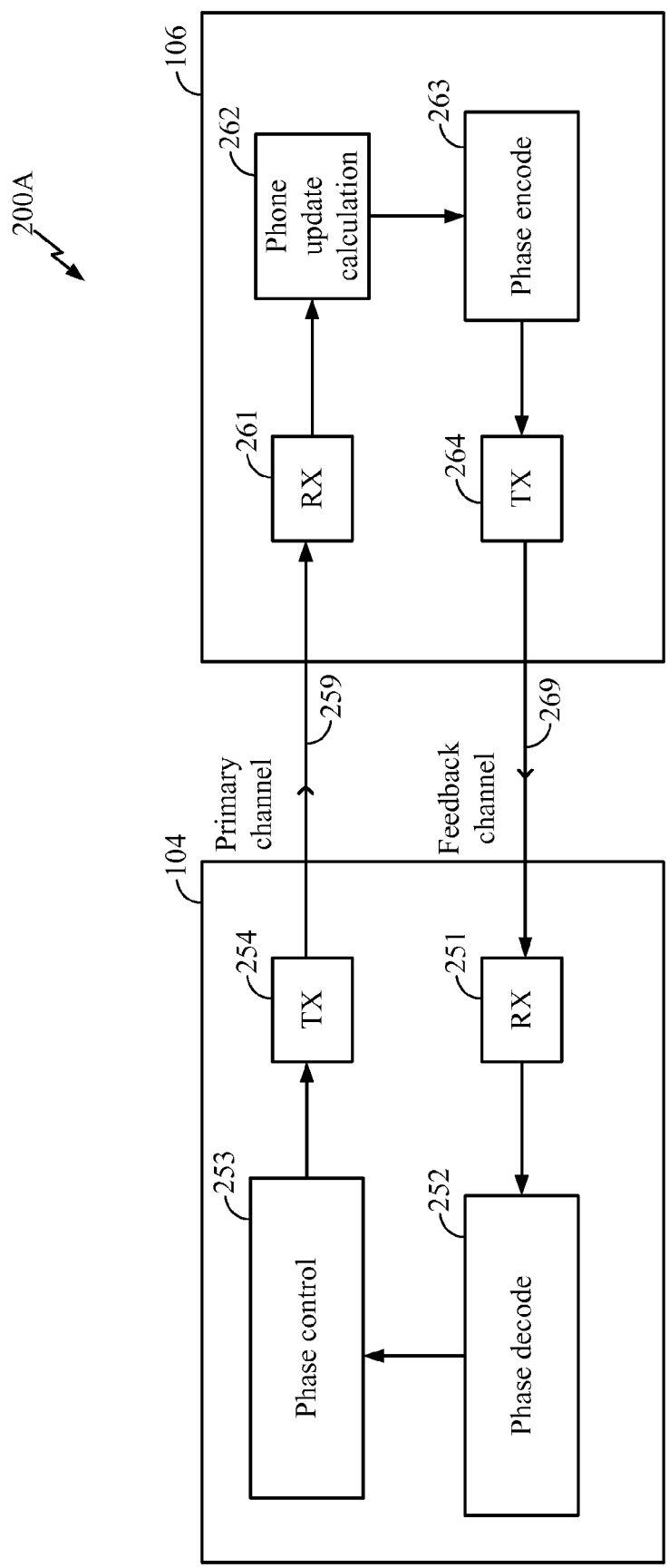
FIG. 2A illustrates an embodiment of processing performed at a base station and mobile station in a closed-loop transmit diversity scheme.

FIG. 2A illustrates an embodiment of processing performed at a base station 104 and mobile station 106 in a closed-loop transmit diversity scheme. In FIG. 2A, a base station 104 includes a receiver (RX) 251 for receiving a feedback signal from the mobile station 106 on the feedback channel 269. The feedback signal is decoded by the phase decode module 252, which sends the decoded phase to the phase control module 253 to adjust the phase of the signals sent by a transmitter (TX) 254. The transmitter 254 transmits signals on the primary channel 259 to the mobile station 106. In an exemplary embodiment, the signals on the primary channel 259 may include signals sent on two antennas, as earlier described herein with reference to FIG. 2.

At the mobile station 106, a receiver (RX) 261 receives the transmitted signals on the primary channel 259. The received signals are provided to a phase update calculation module 262, which calculates a preferred phase adjustment to be applied at the base station 104. The preferred phase adjustment is encoded using a phase encode module 263, and is subsequently sent by the transmitter (TX) 264 on the feedback channel 269 back to the base station 104.

While exemplary embodiments have been described herein with reference to a signaling scheme for closed-loop transmit diversity in a wireless communications system, it will be appreciated that the techniques disclosed herein have broad application outside of the context specifically disclosed. For example, the variable-length prefix coding techniques described may be adopted in any system wherein a multi-level signal is to be communicated on a feedback channel, e.g., a multi-level power control signal, a channel state feedback signal such as a channel quality indicator (CQI), precoding matrix indicator (PMI), rank indicator (RI), etc. The application of the techniques herein to such signals will be readily apparent to one of ordinary skill in the art, and such alternative exemplary embodiments are contemplated to be within the scope of the present disclosure.

Figure 2B:
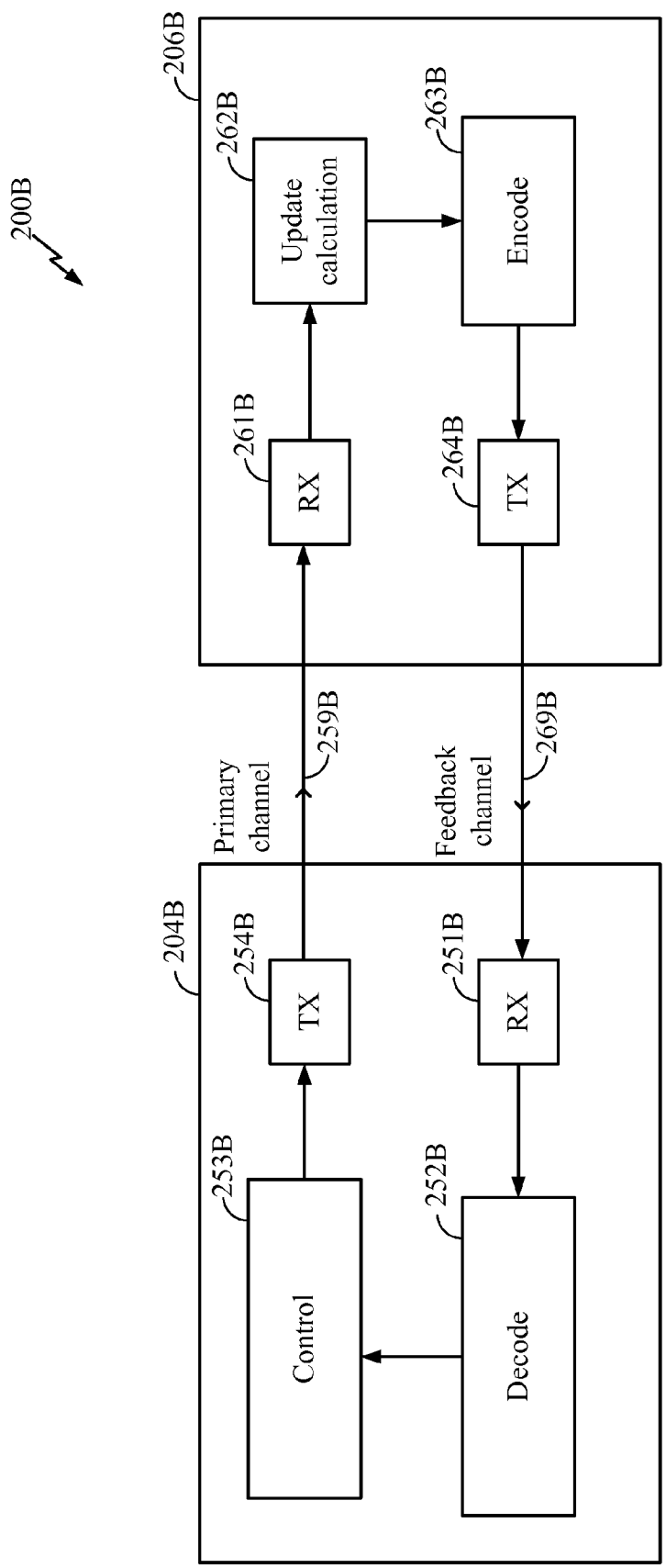
FIG. 2B shows an embodiment of system (not necessarily a transmit diversity system) including a primary channel and a feedback channel.

FIG. 2B shows an embodiment of system 200B (not necessarily a transmit diversity system) including a primary channel and a feedback channel. A first station 204B transmits to a second station 206B over a primary channel 259B. In FIG. 2B, the first station 204B includes a receiver (RX) 251B for receiving a feedback signal from the second station 206B on the feedback channel 269B. The feedback signal is decoded by the decode module 252B, which sends the decoded information to the control module 253B to adjust a characteristic of the signals sent by a transmitter (TX) 254B on the primary channel 259B.

At the second station 206B, a receiver (RX) 261B receives the transmitted signals on the primary channel 259B. The received signals are provided to an update calculation module 262B, which calculates a preferred adjustment to be applied at the first station 204B. The preferred adjustment is encoded using an encode module 263, and is subsequently sent by the transmitter (TX) 264B on the feedback channel 269B back to the primary station 204B.

Figure 3:
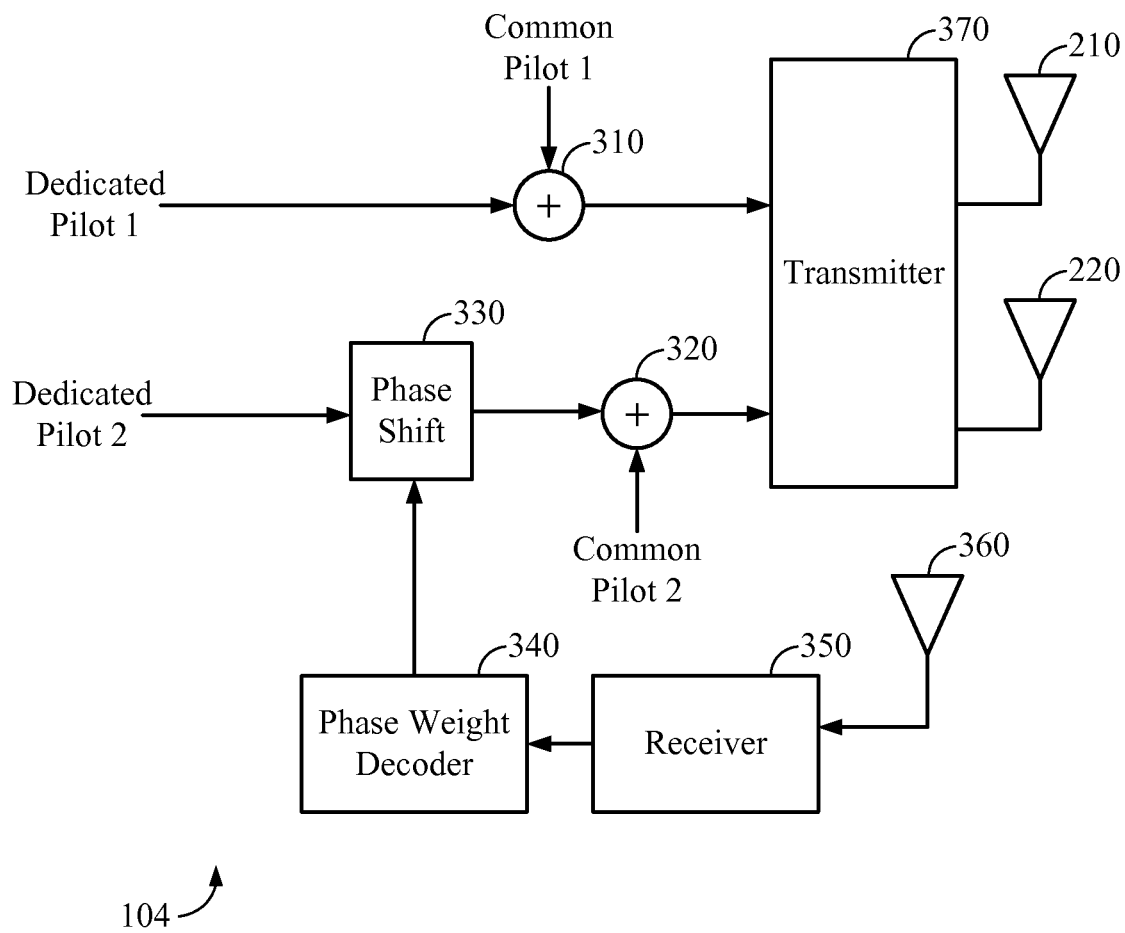
FIG. 3 illustrates in more specificity an embodiment of a base station in a closed-loop transmit diversity system.

FIG. 3 illustrates in more specificity an embodiment of a base station 104 in a closed-loop transmit diversity system. Common pilot 1 is summed with dedicated pilot 1 in summer 310, the result of which is delivered to transmitter 370 for transmission on the first antenna 210. In an exemplary embodiment, common pilot 1 is transmitted continuously, and can be used by a plurality of mobile stations within the cell. Dedicated pilot 1 is transmitted during a portion of a time slot of the control channel associated with the dedicated physical channel established between the base station and a particular mobile station. The combination of common pilot 1 and dedicated pilot 1 as a sum is exemplary only. Alternate embodiments may transmit the two pilots using time division multiplexing, summing, or a combination of both. Those of skill in the art will recognize that various forms of modulation can be applied to the pilot signals, before combination, or upon the combined signal. These modifications are anticipated by and fall within the scope of the present invention. Transmitter 370 may perform up-conversion, amplification, or other procedures well known in the art.

Dedicated pilot 2 is orthogonal to dedicated pilot 1, and is also used in a dedicated physical channel established between the base station 104 and a particular mobile station 106. A phase shift is applied to dedicated pilot 2 by phase shift module 330, and the resulting phase-shifted dedicated pilot 2 is summed with common pilot 2 in summer 320. The resulting sum is delivered to transmitter 370 for transmission on the second antenna 220. Common pilot 2 is orthogonal to common pilot 1. Various techniques for generating orthogonal signals for use in this embodiment are known in the art, examples of which are detailed in the W-CDMA specification. Hereinafter, common pilots 1 and 2 may be referred to as the common pilot, and dedicated pilots 1 and 2 may be referred to as the dedicated pilot. Which common or dedicated pilot is used will be clear from the context, in particular, on which antenna the pilot is transmitted from.

In an exemplary embodiment, the phase adjustment introduced by phase shift module 330 may be derived from a transmission of the mobile station 106 with which the base station 104 is communicating. For example, a feedback signal, containing the phase adjustment information, is received at antenna 360, and delivered to receiver 350 for any required down-conversion, amplification, etc., techniques for which are well known in the art. Those of skill in the art will recognize that antenna 360 is not required, one or more of the transmit antennas can also be used for receiving (details not shown). Receiver 350 also performs any required demodulation to extract the phase adjustment information from the feedback signal. The results are delivered to phase weight decoder 340, where the signaled phase adjustment is determined and delivered to phase shift module 330, for phase adjustment of the dedicated pilot as described above.

In addition to the pilot channels described, data may also be transmitted on antennas 210 and 220. There are a variety of techniques for transmitting data using transmit diversity schemes known in the art. In the exemplary embodiment, the dedicated signals are phase shifted using phase shift module 330, as described above, for transmission on the second antenna 220. The dedicated signals are not phase adjusted when transmitted on the first antenna 210. The dedicated signals may include the dedicated pilot described above, data for the mobile station 106 communicating on the dedicated channel, and other control signals specific to the dedicated channel. The details of the data transmission are not shown.

In one embodiment, the W-CDMA standard is supported. Those of skill in the art will recognize that the principles of the present invention are not limited to W-CDMA systems. In the W-CDMA standard, the common pilot is referred to as the common pilot channel (CPICH) and the dedicated pilot is referred to as the dedicated pilot channel (DPCH). The phase shift introduced in phase shift module 330 is one of the four possibilities shown in the constellation of FIG. 4. A phase difference of A (00)=0°, B (01)=90°, C (10)=180°, or D (11)=270° is introduced, depending on the feedback signal received from mobile station 106. In complex notation, the phase differences correspond to weighting the dedicated pilot by 0, j, −1, or −j, wherein j represents $\sqrt{-1}$.

Figure 5:
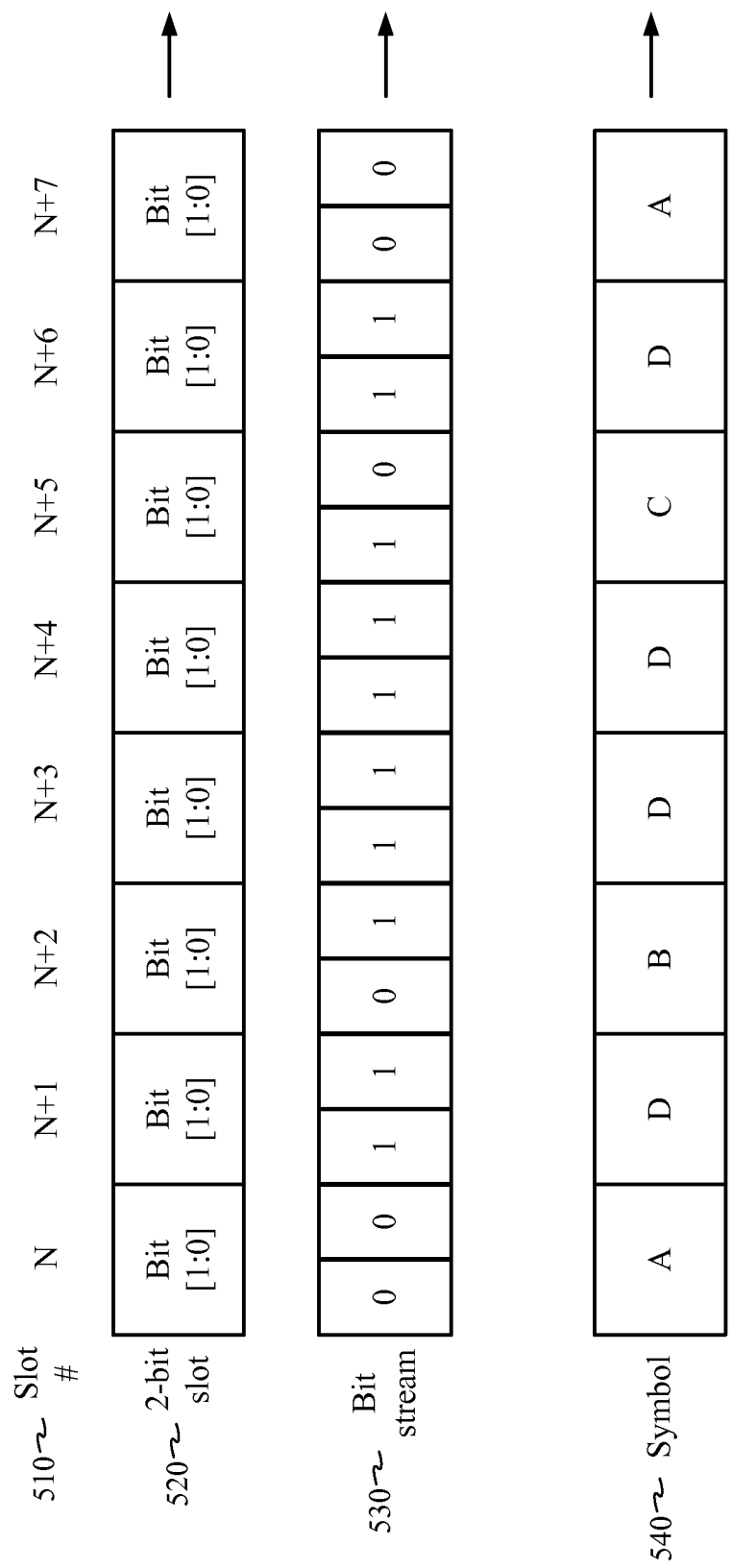
FIG. 5 illustrates an exemplary scheme for providing a feedback signal from a mobile station to a base station using two bits per slot.

Since there are four possibilities, the phase weight can be represented with two bits. In an embodiment, the phase weight is transmitted using two bits per slot, so that one slot is required to specify a particular weight. FIG. 5 illustrates an exemplary scheme 500 for providing a feedback signal from a mobile station to a base station using two bits per slot.

In FIG. 5, row 510 illustrates the numbering of slots starting from N. Row 520 illustrates that two bits, denoted Bit [1:0], are transmitted in each slot. Row 530 illustrates an example bit stream that may be transmitted in the slots. Row 540 illustrates symbols corresponding to the bits, assigned according to the encoding scheme shown in FIG. 4. At the base station 104, the phase weight decoder 340, may recover the phase adjustment corresponding to the symbols by decoding the symbols in the most recently received slot, and thereby determine the weight for phase shift module 330.

Figure 4:
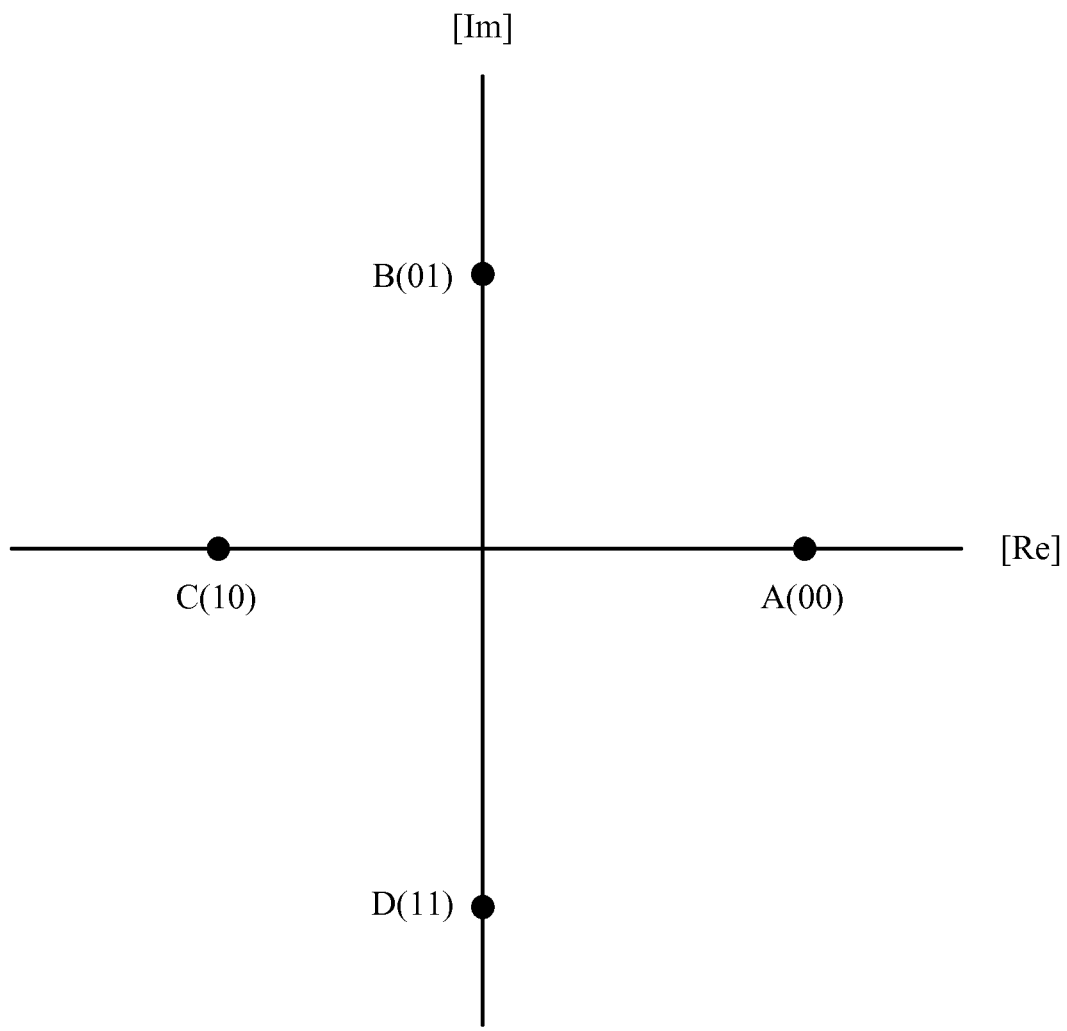
FIG. 4 illustrates an exemplary constellation of the phase shift introduced in a phase shift module.

One of ordinary skill in the art will appreciate that the encoding scheme illustrated in FIG. 4 is an example of a uniformly quantized fixed-length code, i.e., the total phase feedback region of 360° is quantized using a uniform step size, and all codewords have the same length. While being simple to design, such a uniformly quantized fixed-length code also has certain limitations. For example, when a primary channel varies slowly over time (i.e., is "static" or "quasi-static"), there may be an expected bias toward sending a codeword A (00) corresponding to a phase difference of 0° on the feedback channel, while other codewords are essentially unused. This may result in a high level of redundancy and inefficiency. To better deal with dynamically changing channel conditions, it would be desirable to provide an encoding scheme that is more efficient over a broad range of channel conditions than a uniformly quantized fixed-length code.

In an exemplary embodiment according to the present disclosure, a variable-length prefix code may be used to encode the phase adjustments for the feedback signal. One of ordinary skill in the art will appreciate that a variable-length code has the property that the codewords need not all have the same length, while a prefix code has the property that there is no valid code word that is a prefix of any other valid code.

Figure 6:
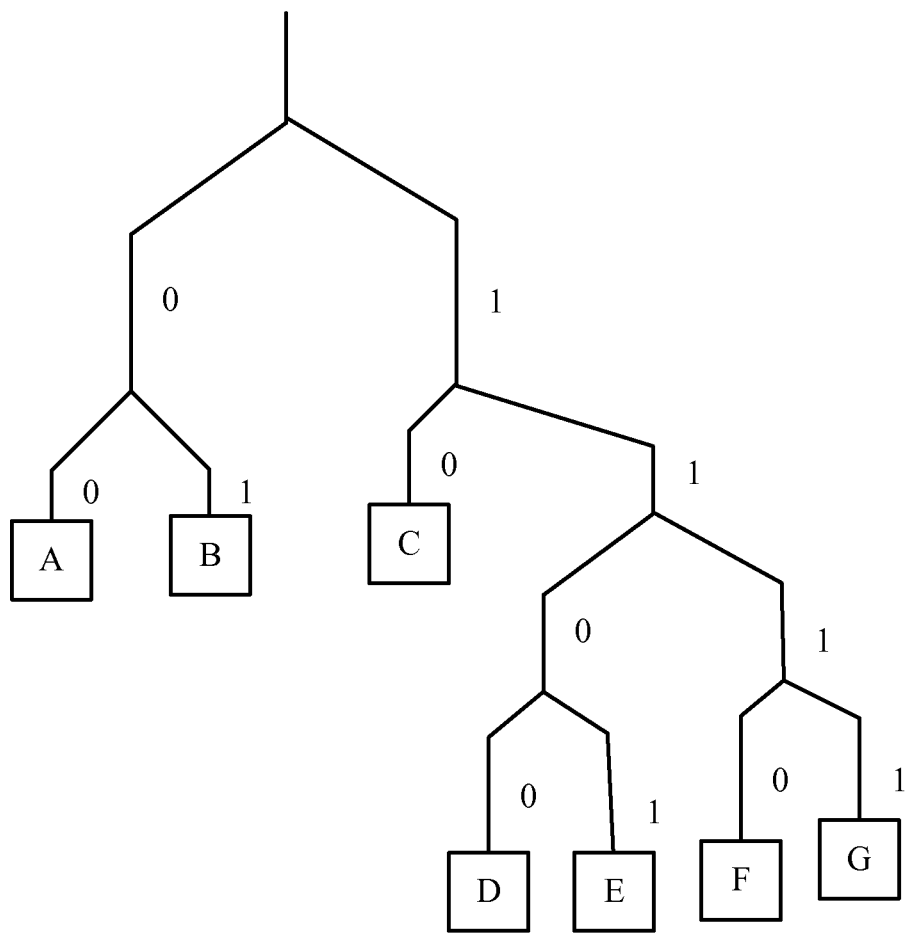
FIGS. 6 and 6A illustrate an example coding scheme according to the present disclosure.
Figure 6A:
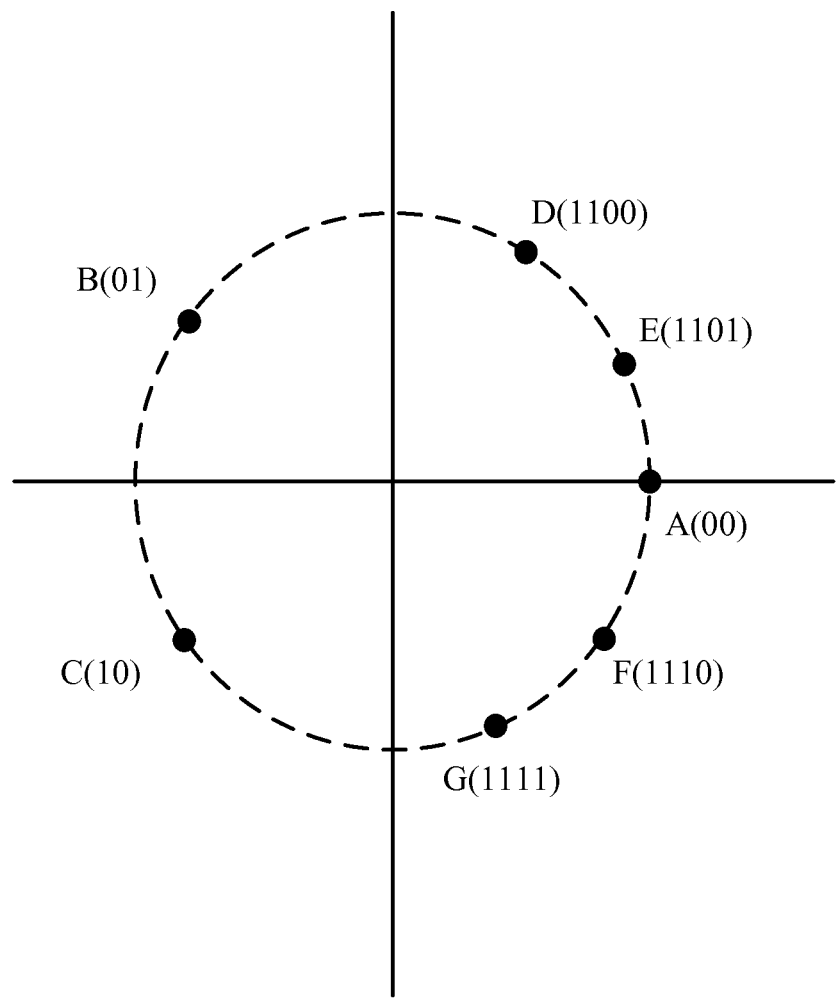

FIGS. 6 and 6A illustrate an example coding scheme according to the present disclosure. Note the coding scheme in FIG. 6 is shown for illustrative purposes only, and is not meant to limit the scope of the present disclosure to any particular coding scheme. Alternative exemplary coding schemes employing any number of codewords, with each codeword having arbitrary length, may readily be designed according to the principles of the present disclosure. Such alternative exemplary embodiments are contemplated to be within the scope of the present disclosure.

FIG. 6 illustrates an exemplary design of a prefix code using a binary tree. In the example shown, a first transmitted symbol of "0" denotes that the codeword is either A or B. To distinguish between A and B, the second transmitted symbol may take on values of either "0" or "1," respectively. Alternatively, a first transmitted symbol of "1" denotes that the codeword may be C, D, E, F, or G. The second transmitted symbol may then take on a value of "0" to denote that the codeword is C, or "1" to denote that the codeword is D, E, F, or G, etc. It will be appreciated that by constructing the code in this manner, no valid codeword will be the prefix of any other valid codeword. It will be appreciated that the prefix code in this case is also a variable-length code, i.e., not all codewords have the same length.

FIG. 6A illustrates an exemplary assignment of the codewords provided in FIG. 6 to phase adjustments for a closed-loop transmit diversity scheme as earlier described. In FIG. 6A, the possible encoded phase adjustments are A (00)=0°, B (01)=120°, C (10)=240°, D (1100)=60°, E (1101)=30°, F (1110)=330°, and G (1111)=300°.

Note the assignment shown in FIG. 6A is an example of a non-uniformly quantized code, i.e., the total phase feedback region of 360° is quantized using non-uniform step sizes. For example, the angular step size between the zero-phase codeword A (00)=0° and the next (i.e., corresponding to the next larger angle) codeword E (1101)=30° is 30°, while the angular step size between the codeword B (01)=120° and the next codeword C (10)=240° is 120°. It will be appreciated that a non-uniformly quantized code allows certain phase adjustments, e.g., phase adjustments around 0°, to be quantized using finer step sizes, and other phase adjustments to be quantized using coarser step sizes. Such non-uniform quantization may advantageously help reduce the quantization error when the primary channel varies, e.g., from a static or quasi-static channel to a rapidly changing channel, as previously described herein.

In certain exemplary embodiments (not shown), it will be appreciated that the variable-length prefix code disclosed herein need not be a non-uniformly quantized code. For example, the variable-length prefix code may readily be applied to a uniformly quantized phase adjustment encoding scheme as well. Such alternative exemplary embodiments are also contemplated to be within the scope of the present disclosure.

In an exemplary embodiment, the assignment of the codewords of a variable-length prefix code to particular phase adjustments may be performed off-line, and provided in the form of look-up tables to both the base station and the mobile station for use in real-time operation. In an exemplary embodiment, the assignment of the codewords of a variable-length prefix code to particular phase adjustments may be made according to a Huffman encoding algorithm well-known in the art. According to such an algorithm, phase adjustments having higher probability may be encoded using, e.g., codewords of shorter length. Furthermore, the codeword assignment may be made to jointly optimize entropy, latency, priority considerations. Such exemplary embodiments are contemplated to be within the scope of the present disclosure.

Figure 7:
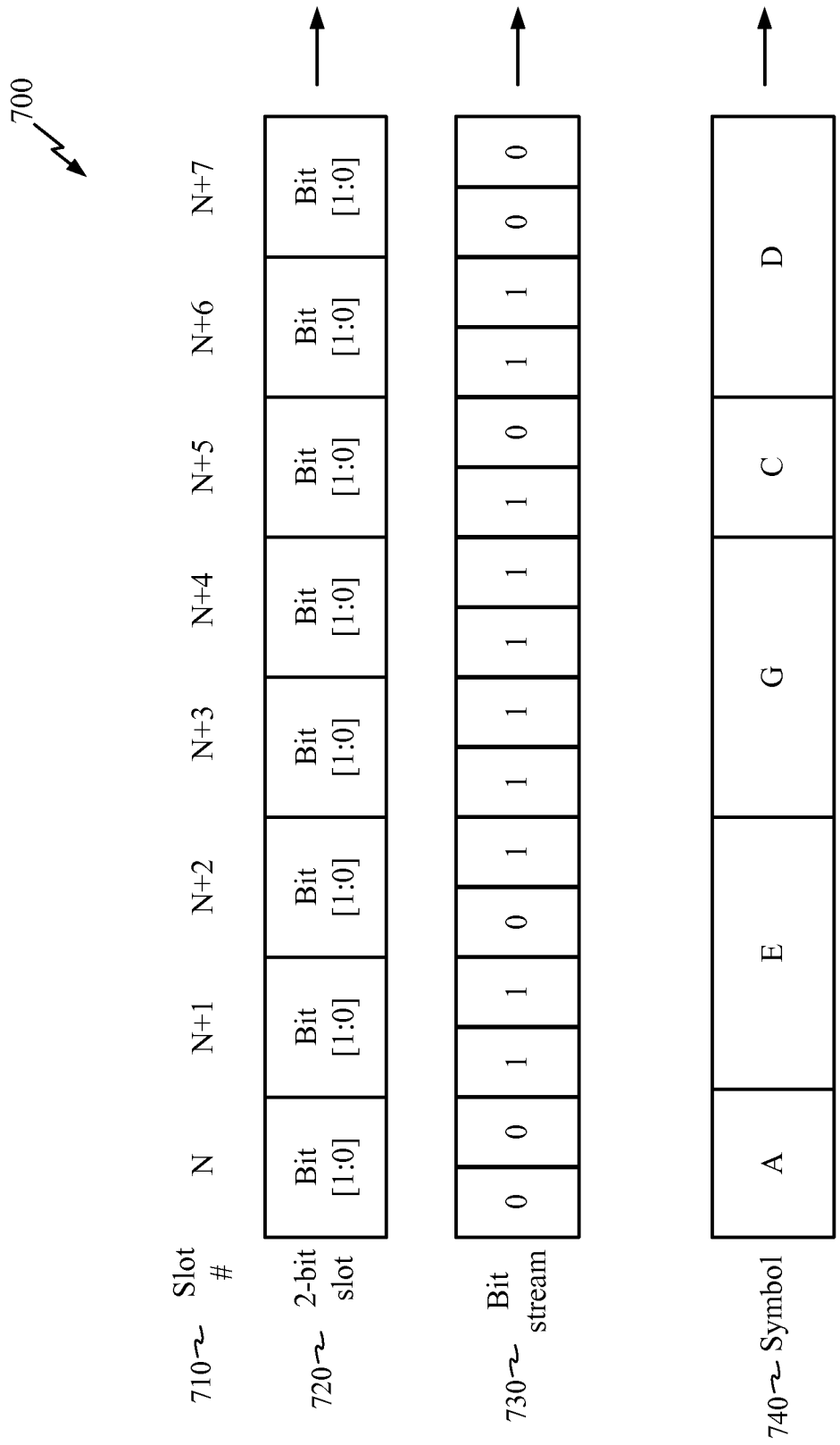
FIG. 7 illustrates an exemplary scheme for providing a feedback signal from a mobile station to a base station using the exemplary variable-length prefix coding scheme shown in FIGS. 6 and 6A.

FIG. 7 illustrates an exemplary scheme 700 for providing a feedback signal from a mobile station to a base station using the exemplary variable-length prefix coding scheme shown in FIGS. 6 and 6A.

In FIG. 7, row 710 illustrates the numbering of slots starting from N. Row 720 illustrates that two bits, denoted Bit [1:0], are transmitted in each slot. Row 730 illustrates an example bit stream that may be transmitted in the slots. Row 740 illustrates symbols corresponding to the bits, assigned according to the encoding scheme shown in FIGS. 6 and 6A.

In FIG. 7, it will be appreciated that due to the encoding scheme being a prefix code, the signaled phase adjustments be transmitted as a concatenated sequence of codewords, without any special symbols (e.g., "comma" symbols), signaled in-band or out-of-band, to demarcate the individual codewords. The base station 104 may readily decode the received sequence of codewords by simply identifying the prefixes that form valid codewords.

It will be appreciated that as two bits are transmitted in each slot, and a single codeword may have more than two bits, it may transmit multiple slots to convey a single codeword.

While this may reduce the rate of feedback of the phase adjustment from the mobile station 106 to the base station 104 compared to, e.g., a two-bit code as shown in FIG. 4, such rate reduction may be acceptable wherein longer codewords (e.g., those having more than two bits) are reserved for, e.g., phase adjustments around 0°, which may occur more frequently in slowly varying or fixed channels.

While exemplary embodiments of the present disclosure have been described wherein two bits of a feedback signal for phase adjustment are transmitted in each slot, and each codeword contains an even number of bits, it will be appreciated that alternative exemplary embodiments may readily adopt alternative signaling and encoding schemes. For example, a codeword may contain an odd number of bits, in which case the beginning and end of each codeword need necessarily corresponding to the slot boundaries shown in FIG. 7. Alternatively, a slot may be configured to transmit any number of bits of the feedback signal. Such alternative exemplary embodiments are contemplated to be within the scope of the present disclosure.

While exemplary embodiments of the present disclosure have been described wherein each codeword encodes a specific angle of phase adjustment, it will be appreciated that alternative exemplary embodiments may assign each codeword to represent information other than, or in addition, to a specific angle of phase adjustment to be applied between the first and second antennas. For example, a codeword may be assigned to represent a change (i.e., a "differential phase adjustment") between: 1) a previously applied phase difference between the first and second antennas, and 2) a desired phase difference to be applied between the first and second antennas, e.g., in a next time slot. Such alternative exemplary embodiments are contemplated to be within the scope of the present disclosure.

It will be appreciated that the techniques disclosed herein allow phase adjustments of arbitrary precision to be signaled on the feedback channel, without further signaling an explicit "mode" parameter (i.e., control channel signaling overhead) as is required in certain adaptive quantization techniques known in the art. However, the variable-length prefix code disclosed herein need not be restricted to embodiments wherein no mode parameter is signaled. In an exemplary embodiment, one or more of the variable-length prefix codewords may be allocated to a "mode" parameter in an adaptive quantization scheme, wherein a quantization step size is varied based on a most recently in-band signaled mode parameter.

FIG. 8 illustrates an exemplary embodiment of a signaling scheme wherein the specific phase adjustment corresponding to codewords B, C, D, and E depend on the value of a signaled mode "parameter," and the mode parameter itself is signaled in-band using codewords F and G. For example, when smaller phase adjustments are expected, e.g., in a static or quasi-static channel, Mode=1 may be signaled so that codewords A, B, C, D, and E cover a range of +/−40°. On the other hand, when larger phase adjustments are expected, Mode=0 may be signaled so that codewords A, B, C, D, and E cover the full range of 360°. In an exemplary embodiment, the assignment of codewords to signaled parameters may be based, e.g., on the length of each codeword, as well as the expected likelihood in any scenario that a mode switch will occur.

Note FIG. 8 is provided for illustrative purposes only, and one of ordinary skill in the art will appreciate that the variable-length prefix coding techniques of the present disclosure may also be used to encode alternative phase adjustment signaling schemes (not shown) according to the present disclosure. In an alternative exemplary embodiment (not shown), the specific assignment of codewords to phase adjustments (i.e., the "codebook") may be dynamically varied during normal operation using over-the-air signaling from a mobile station to a base station, or from a base station to a mobile station. In an exemplary embodiment, an indication to change the codebook may itself be signaled using a codeword in the current codebook. Alternatively, the indication to change the codebook may be separately signaled on a separate control channel known to both the base station and the mobile station. Such alternative exemplary embodiments are contemplated to be within the scope of the present disclosure.

It will be appreciated that the techniques of the present disclosure may also be readily applied to systems employing adaptive quantization of the phase adjustment with backward estimation. In such systems, the instantaneous step size of the signaled phase adjustment may be varied (or "adapted") based on a past history of information received over the feedback channel. The adaptation of step size may be executed according to an algorithm known to both the base station 104 and the mobile station 106. For example, step size may be varied in accordance with adaptive delta modulation or continuously variable slope delta modulation (CVSD) techniques known to one of ordinary skill in the art. It will be appreciated that codewords chosen from a variable-length prefix code according to the present disclosure may be used to represent the signaled phase adjustments in such systems. Such alternative exemplary embodiments are contemplated to be within the scope of the present disclosure.

Figure 9A:
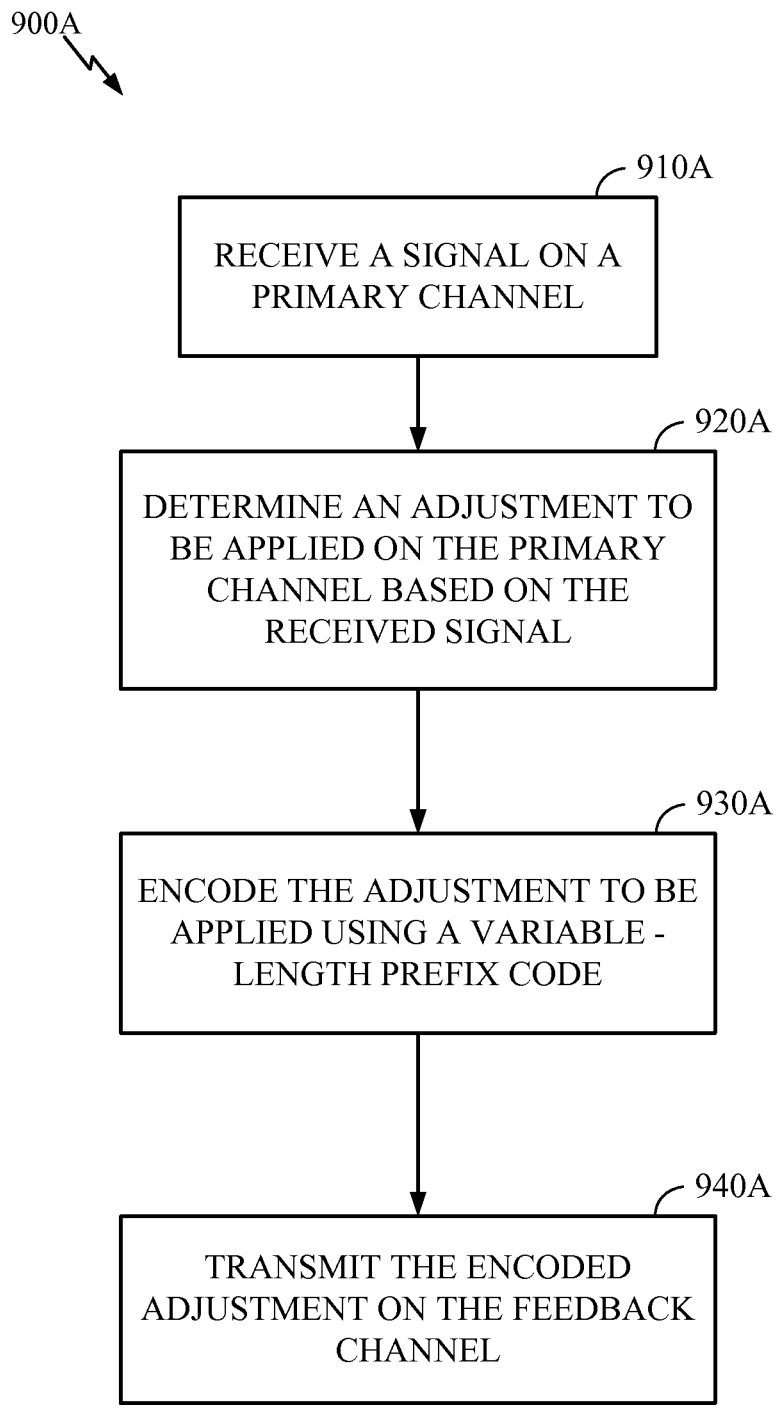
FIGS. 9A and 9B illustrate exemplary methods according to the present disclosure.
Figure 9B:
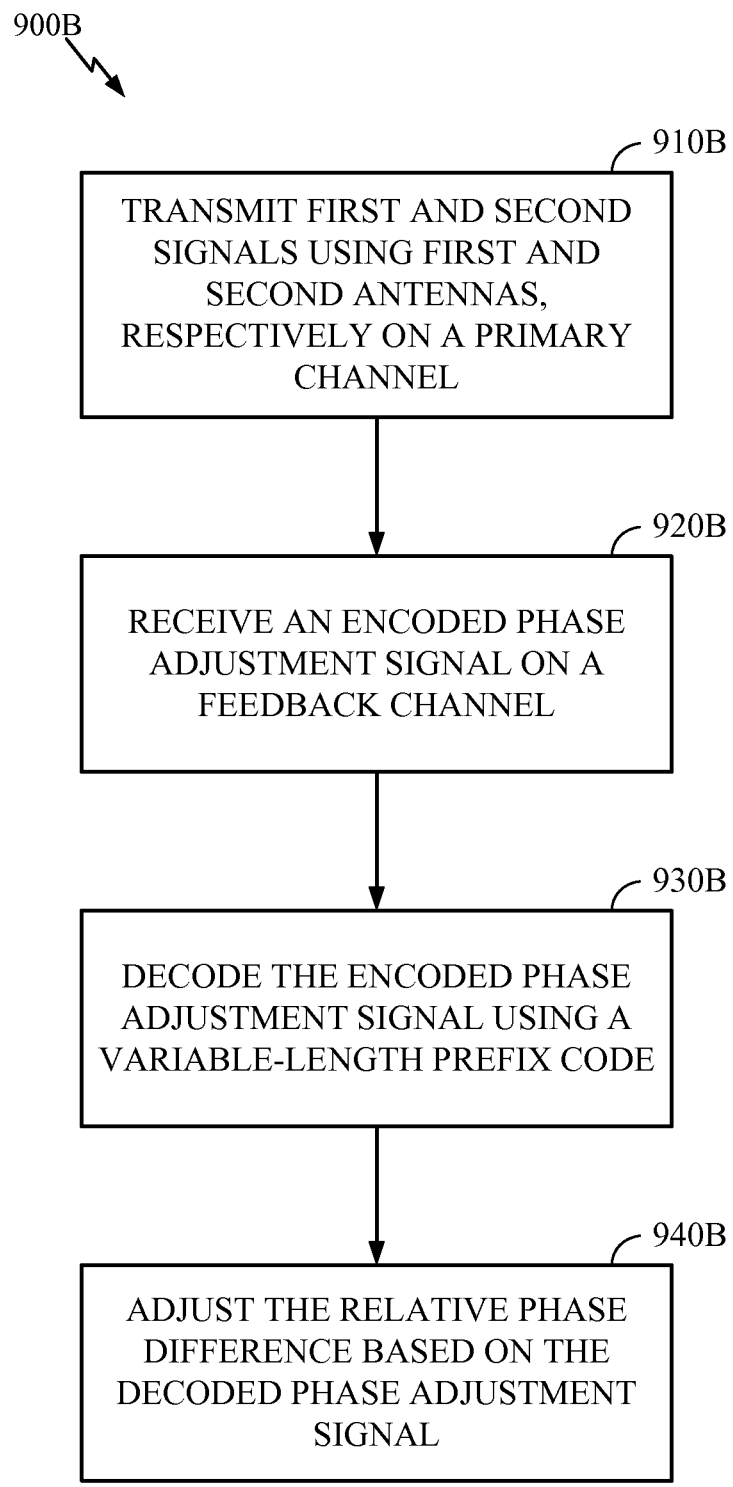

FIGS. 9A and 9B illustrate exemplary methods 900A and 900B according to the present disclosure. Note the method 900A and 900B are shown for illustrative purposes only, and are not meant to limit the scope of the present disclosure.

In FIG. 9A, the method 900A is for transmitting information on a feedback channel.

At block 910A, a signal is received on a primary channel.

At block 920A, an adjustment to be applied on the primary channel is determined based on the received signal.

At block 930A, the adjustment to be applied is encoded using a variable-length prefix code.

At block 940A, the encoded adjustment is transmitted on the feedback channel.

In FIG. 9B, the method 900B is for receiving information on a feedback channel.

At block 910B, first and second signals are transmitted using first and second antennas, respectively, on a primary channel. The first and second signals have a relative phase difference.

At block 920B, an encoded phase adjustment signal is received on a feedback channel.

At block 930B, the encoded phase adjustment signal is decoded using a variable-length prefix code.

At block 940B, the relative phase difference is adjusted based on the decoded phase adjustment signal.

Further described herein with reference to FIGS. 10A-10D is an example radio network operating according to UMTS in which the principles of the present disclosure may be applied. Note FIGS. 10A-10D are shown for illustrative background purposes only, and are not meant to limit the scope of the present disclosure to radio networks operating according to UMTS.

Figure 10A:
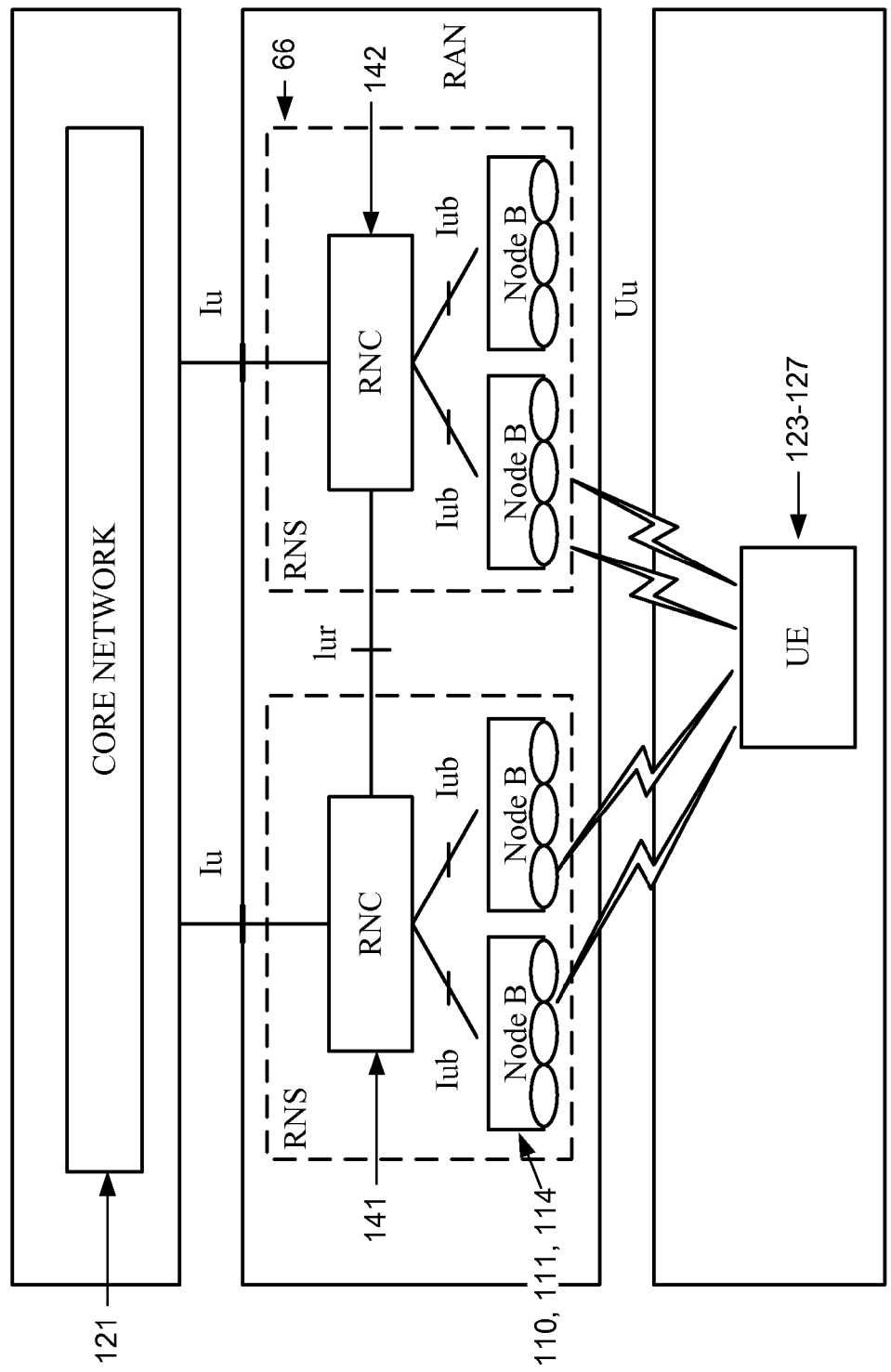
FIG. 10A illustrates an example of a radio network.

FIG. 10A illustrates an example of a radio network. In FIG. 10A, Node Bs 110, 111, 114 and radio network controllers 141-144 are parts of a network called "radio network," "RN," "access network," or "AN." The radio network may be a UMTS Terrestrial Radio Access Network (UTRAN). A UMTS Terrestrial Radio Access Network (UTRAN) is a collective term for the Node Bs (or base stations) and the control equipment for the Node Bs (or radio network controllers (RNC)) it contains which make up the UMTS radio access network. This is a 3 G communications network which can carry both real-time circuit-switched and IP-based packet-switched traffic types. The UTRAN provides an air interface access method for the user equipment (UE) 123-127. Connectivity is provided between the UE and the core network by the UTRAN. The radio network may transport data packets between multiple user equipment devices 123-127.

The UTRAN is connected internally or externally to other functional entities by four interfaces: Iu, Uu, Iub and Iur. The UTRAN is attached to a GSM core network 121 via an external interface called Iu. Radio network controllers (RNC's) 141-144 (shown in FIG. 10B), of which 141, 142 are shown in FIG. 10A, support this interface. In addition, the RNC manages a set of base stations called Node Bs through interfaces labeled Iub. The Iur interface connects two RNCs 141, 142 with each other. The UTRAN is largely autonomous from the core network 121 since the RNCs 141-144 are interconnected by the Iur interface. FIG. 10A discloses a communication system which uses the RNC, the Node Bs and the Iu and Uu interfaces. The Uu is also external and connects the Node B with the UE, while the Iub is an internal interface connecting the RNC with the Node B.

The radio network may be further connected to additional networks outside the radio network, such as a corporate intranet, the Internet, or a conventional public switched telephone network as stated above, and may transport data packets between each user equipment device 123-127 and such outside networks.

Figure 10B:
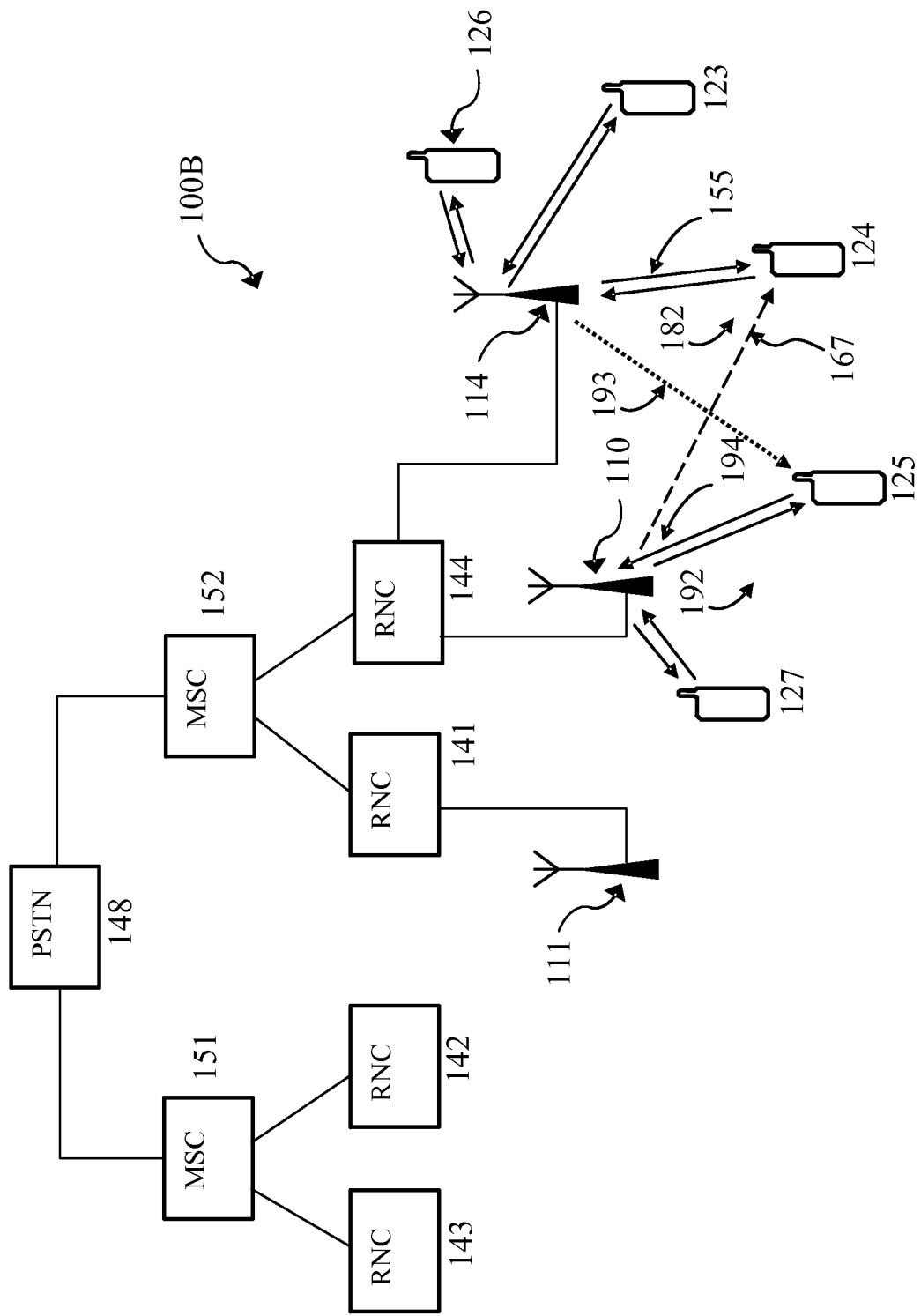
FIG. 10B illustrates selected components of a communication network, which includes a radio network controller (RNC) (or base station controller (BSC)) coupled to Node Bs (or base stations or wireless base transceiver stations).

FIG. 10B illustrates selected components of a communication network 100B, which includes a radio network controller (RNC) (or base station controller (BSC)) 141-144 coupled to Node Bs (or base stations or wireless base transceiver stations) 110, 111, and 114. The Node Bs 110, 111, 114 communicate with user equipment (or remote stations) 123-127 through corresponding wireless connections 155, 167, 182, 192, 193, 194. The RNC 141-144 provides control functionalities for one or more Node Bs. The radio network controller 141-144 is coupled to a public switched telephone network (PSTN) 148 through a mobile switching center (MSC) 151, 152. In another example, the radio network controller 141-144 is coupled to a packet switched network (PSN) (not shown) through a packet data server node ("PDSN") (not shown). Data interchange between various network elements, such as the radio network controller 141-144 and a packet data server node, can be implemented using any number of protocols, for example, the Internet Protocol ("IP"), an asynchronous transfer mode ("ATM") protocol, T1, E1, frame relay, and other protocols.

The RNC fills multiple roles. First, it may control the admission of new mobiles or services attempting to use the Node B. Second, from the Node B, or base station, point of view, the RNC is a controlling RNC. Controlling admission ensures that mobiles are allocated radio resources (bandwidth and signal/noise ratio) up to what the network has available. It is where the Node B's Iub interface terminates. From the UE, or mobile, point of view, the RNC acts as a serving RNC in which it terminates the mobile's link layer communications. From a core network point of view, the serving RNC terminates the Iu for the UE. The serving RNC also controls the admission of new mobiles or services attempting to use the core network over its Iu interface.

For an air interface, UMTS most commonly uses a wideband spread-spectrum mobile air interface known as wideband code division multiple access (or W-CDMA). W-CDMA uses a direct sequence code division multiple access signaling method (or CDMA) to separate users. W-CDMA (Wideband Code Division Multiple Access) is a third generation standard for mobile communications. W-CDMA evolved from GSM (Global System for Mobile Communications)/GPRS a second generation standard, which is oriented to voice communications with limited data capability. The first commercial deployments of W-CDMA are based on a version of the standards called W-CDMA Release 99.

The Release 99 specification defines two techniques to enable Uplink packet data. Most commonly, data transmission is supported using either the Dedicated Channel (DCH) or the Random Access Channel (RACH). However, the DCH is the primary channel for support of packet data services. Each remote station 123-127 uses an orthogonal variable spreading factor (OVSF) code. An OVSF code is an orthogonal code that facilitates uniquely identifying individual communication channels, as will be appreciated by one skilled in the art. In addition, micro diversity is supported using soft handover and closed loop power control is employed with the DCH.

Pseudorandom noise (PN) sequences are commonly used in CDMA systems for spreading transmitted data, including transmitted pilot signals. The time required to transmit a single value of the PN sequence is known as a chip, and the rate at which the chips vary is known as the chip rate. Inherent in the design of direct sequence CDMA systems is the requirement that a receiver aligns its PN sequences to those of the Node B 110, 111, 114. Some systems, such as those defined by the W-CDMA standard, differentiate base stations 110, 111, 114 using a unique PN code for each, known as a primary scrambling code. The W-CDMA standard defines two Gold code sequences for scrambling the downlink, one for the in-phase component (I) and another for the quadrature (Q). The I and Q PN sequences together are broadcast throughout the cell without data modulation. This broadcast is referred to as the common pilot channel (CPICH). The PN sequences generated are truncated to a length of 38,400 chips. A period of 38,400 chips is referred to as a radio frame. Each radio frame is divided into 15 equal sections referred to as slots. W-CDMA Node Bs 110, 111, 114 operate asynchronously in relation to each other, so knowledge of the frame timing of one base station 110, 111, 114 does not translate into knowledge of the frame timing of any other Node B 110, 111, 114. In order to acquire this knowledge, W-CDMA systems use synchronization channels and a cell searching technique.

3GPP Release 5 and later supports High-Speed Downlink Packet Access (HSDPA). 3GPP Release 6 and later supports High-Speed Uplink Packet Access (HSUPA). HSDPA and HSUPA are sets of channels and procedures that enable high-speed packet data transmission on the downlink and uplink, respectively. Release 7 HSPA+ uses 3 enhancements to improve data rate. First, it introduced support for 2×2 MIMO on the downlink. With MIMO, the peak data rate supported on the downlink is 28 Mbps. Second, higher order modulation is introduced on the downlink. The use of 64 QAM on the downlink allows peak data rates of 21 Mbps. Third, higher order modulation is introduced on the uplink. The use of 16 QAM on the uplink allows peak data rates of 11 Mbps.

In HSUPA, the Node B 110, 111, 114 allows several user equipment devices 123-127 to transmit at a certain power level at the same time. These grants are assigned to users by using a fast scheduling algorithm that allocates the resources on a short-term basis (every tens of ms). The rapid scheduling of HSUPA is well suited to the bursty nature of packet data. During periods of high activity, a user may get a larger percentage of the available resources, while getting little or no bandwidth during periods of low activity.

In 3GPP Release 5 HSDPA, a base transceiver station 110, 111, 114 of an access network sends downlink payload data to user equipment devices 123-127 on High Speed Downlink Shared Channel (HS-DSCH), and the control information associated with the downlink data on High Speed Shared Control Channel (HS-SCCH). There are 256 Orthogonal Variable Spreading Factor (OVSF or Walsh) codes used for data transmission. In HSDPA systems, these codes are partitioned into release 1999 (legacy system) codes that are typically used for cellular telephony (voice), and HSDPA codes that are used for data services. For each transmission time interval (TTI), the dedicated control information sent to an HSDPA-enabled user equipment device 123-127 indicates to the device which codes within the code space will be used to send downlink payload data to the device, and the modulation that will be used for transmission of the downlink payload data.

With HSDPA operation, downlink transmissions to the user equipment devices 123-127 may be scheduled for different transmission time intervals using the 15 available HSDPA OVSF codes. For a given TTI, each user equipment device 123-127 may be using one or more of the 15 HSDPA codes, depending on the downlink bandwidth allocated to the device during the TTI. As has already been mentioned, for each TTI the control information indicates to the user equipment device 123-127 which codes within the code space will be used to send downlink payload data (data other than control data of the radio network) to the device, and the modulation that will be used for transmission of the downlink payload data.

In a MIMO system, there are N (# of transmitter antennas) by M (# of receiver antennas) signal paths from the transmit and the receive antennas, and the signals on these paths are not identical. MIMO creates multiple data transmission pipes. The pipes are orthogonal in the space-time domain. The number of pipes equals the rank of the system. Since these pipes are orthogonal in the space-time domain, they create little interference with each other. The data pipes are realized with proper digital signal processing by properly combining signals on the N×M paths. It is noted that a transmission pipe does not correspond to an antenna transmission chain or any one particular transmission path.

Communication systems may use a single carrier frequency or multiple carrier frequencies. Each link may incorporate a different number of carrier frequencies. Furthermore, an access terminal 123-127 may be any data device that communicates through a wireless channel or through a wired channel, for example using fiber optic or coaxial cables. An access terminal 123-127 may be any of a number of types of devices including but not limited to PC card, compact flash, external or internal modem, or wireless or wireline phone. The access terminal 123-127 is also known as user equipment (UE), a remote station, a mobile station or a subscriber station. Also, the UE 123-127 may be mobile or stationary.

User equipment 123-127 that has established an active traffic channel connection with one or more Node Bs 110, 111, 114 is called active user equipment 123-127, and is said to be in a traffic state. User equipment 123-127 that is in the process of establishing an active traffic channel connection with one or more Node Bs 110, 111, 114 is said to be in a connection setup state. User equipment 123-127 may be any data device that communicates through a wireless channel or through a wired channel, for example using fiber optic or coaxial cables. The communication link through which the user equipment 123-127 sends signals to the Node B 110, 111, 114 is called an uplink. The communication link through which a NodeB 110, 111, 114 sends signals to a user equipment 123-127 is called a downlink.

Figure 10C:
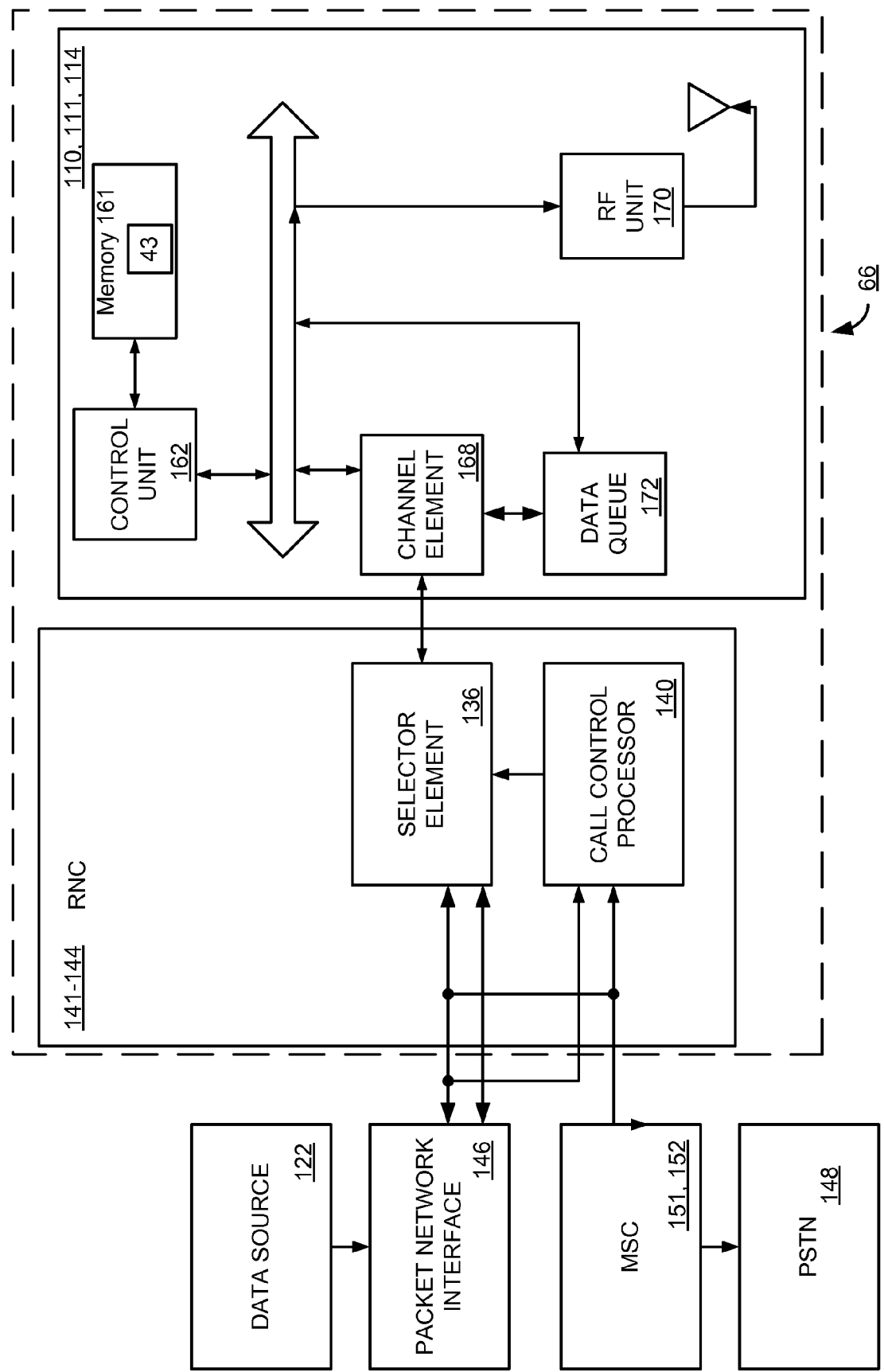
FIG. 10C is detailed herein below, wherein specifically, a Node B and radio network controller interface with a packet network interface.

FIG. 10C is detailed herein below, wherein specifically, a Node B 110, 111, 114 and radio network controller 141-144 interface with a packet network interface 146. (Note in FIG. 10C, only one Node B 110, 111, 114 is shown for simplicity.) The Node B 110, 111, 114 and radio network controller 141-144 may be part of a radio network server (RNS) 66, shown in FIG. 10A and in FIG. 10C as a dotted line surrounding one or more Node Bs 110, 111, 114 and the radio network controller 141-144. The associated quantity of data to be transmitted is retrieved from a data queue 172 in the Node B 110, 111, 114 and provided to the channel element 168 for transmission to the user equipment 123-127 (not shown in FIG. 10C) associated with the data queue 172.

Radio network controller 141-144 interfaces with a Public Switched Telephone Network (PSTN) 148 through a mobile switching center 151, 152. Also, radio network controller 141-144 interfaces with Node Bs 110, 111, 114 in the communication system 100B. In addition, radio network controller 141-144 interfaces with a Packet Network Interface 146. Radio network controller 141-144 coordinates the communication between user equipment 123-127 in the communication system and other users connected to a packet network interface 146 and PSTN 148. PSTN 148 interfaces with users through a standard telephone network (not shown in FIG. 10C).

Radio network controller 141-144 contains many selector elements 136, although only one is shown in FIG. 10C for simplicity. Each selector element 136 is assigned to control communication between one or more Node B's 110, 111, 114 and one remote station 123-127 (not shown). If selector element 136 has not been assigned to a given user equipment 123-127, call control processor 140 is informed of the need to page the user equipment 123-127. Call control processor 140 then directs Node B 110, 111, 114 to page the user equipment 123-127.

Data source 122 contains a quantity of data, which is to be transmitted to a given user equipment 123-127. Data source 122 provides the data to packet network interface 146. Packet network interface 146 receives the data and routes the data to the selector element 136. Selector element 136 then transmits the data to Node B 110, 111, 114 in communication with the target user equipment 123-127. In the exemplary embodiment, each Node B 110, 111, 114 maintains a data queue 172, which stores the data to be transmitted to the user equipment 123-127.

For each data packet, channel element 168 inserts the control fields to be used. In the exemplary embodiment, channel element 168 performs a cyclic redundancy check, CRC, encoding of the data packet and control fields and inserts a set of code tail bits. The data packet, control fields, CRC parity bits, and code tail bits comprise a formatted packet. In the exemplary embodiment, channel element 168 then encodes the formatted packet and interleaves (or reorders) the symbols within the encoded packet. In the exemplary embodiment, the interleaved packet is covered with a Walsh code, and spread with the short PNI and PNQ codes. The spread data is provided to RF unit 170 which quadrature modulates, filters, and amplifies the signal. The downlink signal is transmitted over the air through an antenna to the downlink.

At the user equipment 123-127, the downlink signal is received by an antenna and routed to a receiver. The receiver filters, amplifies, quadrature demodulates, and quantizes the signal. The digitized signal is provided to a demodulator where it is despread with the short PNI and PNQ codes and decovered with the Walsh cover. The demodulated data is provided to a decoder which performs the inverse of the signal processing functions done at Node B 110, 111, 114, specifically the de-interleaving, decoding, and CRC check functions. The decoded data is provided to a data sink.

Figure 10D:
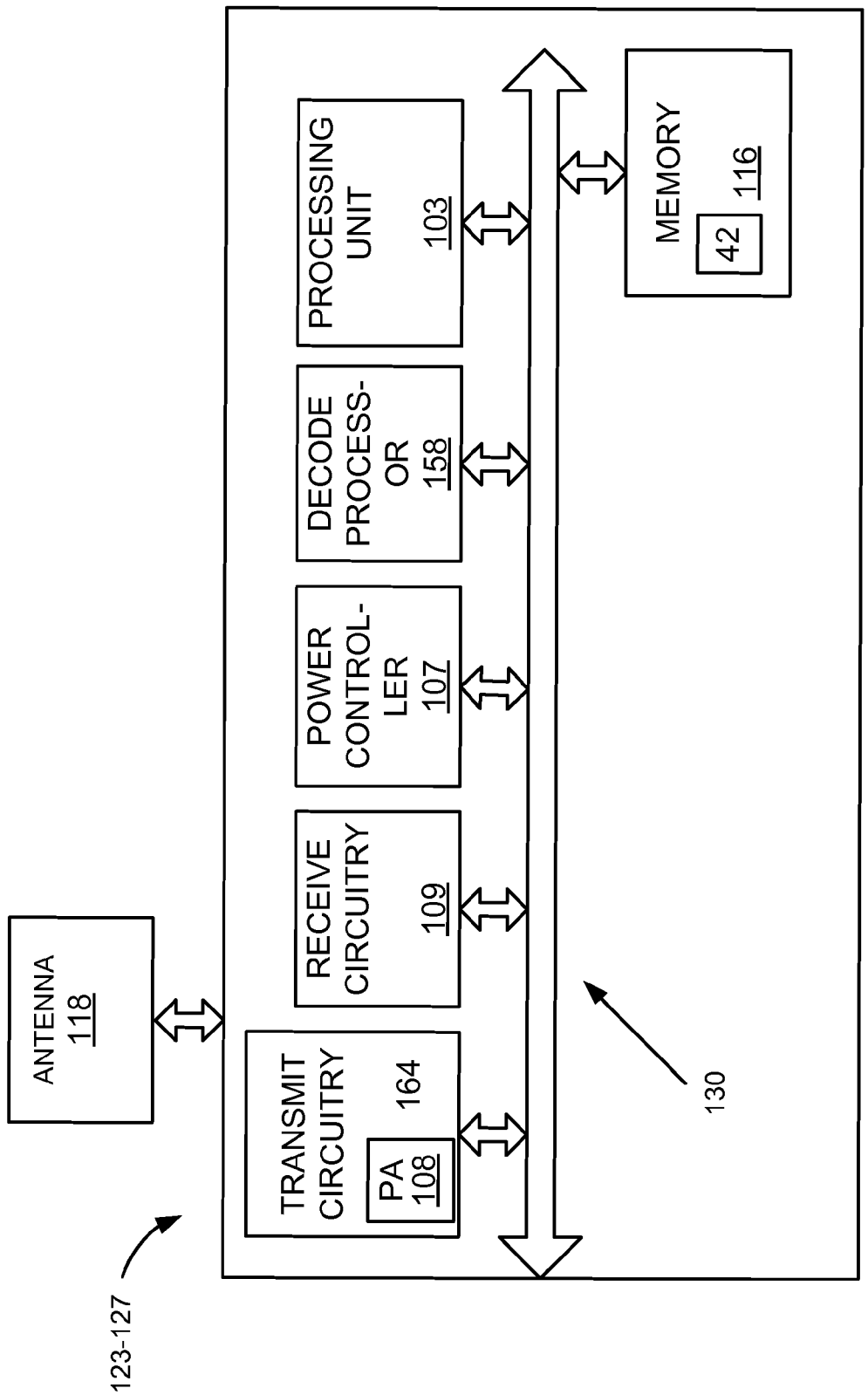
FIG. 10D illustrates an embodiment of a user equipment (UE) in which the UE includes transmit circuitry (including PA), receive circuitry, power controller, decode processor, processing unit, and memory.

FIG. 10D illustrates an embodiment of a user equipment (UE) 123-127 in which the UE 123-127 includes transmit circuitry 164 (including PA 108), receive circuitry 109, power controller 107, decode processor 158, processing unit 103, and memory 116.

The processing unit 103 controls operation of the UE 123-127. The processing unit 103 may also be referred to as a CPU. Memory 116, which may include both read-only memory (ROM) and random access memory (RAM), provides instructions and data to the processing unit 103. A portion of the memory 116 may also include non-volatile random access memory (NVRAM).

The UE 123-127, which may be embodied in a wireless communication device such as a cellular telephone, may also include a housing that contains a transmit circuitry 164 and a receive circuitry 109 to allow transmission and reception of data, such as audio communications, between the UE 123-127 and a remote location. The transmit circuitry 164 and receive circuitry 109 may be coupled to an antenna 118.

The various components of the UE 123-127 are coupled together by a bus system 130 which may include a power bus, a control signal bus, and a status signal bus in addition to a data bus. However, for the sake of clarity, the various busses are illustrated in FIG. 10D as the bus system 130. The UE 123-127 may also include a processing unit 103 for use in processing signals. Also shown are a power controller 107, a decode processor 158, and a power amplifier 108.

The steps of the methods discussed may also be stored as instructions in the form of software or firmware 43 located in memory 161 in the Node B 110, 111, 114, as shown in FIG. 10C. These instructions may be executed by the control unit 162 of the Node B 110, 111, 114 in FIG. 10C. Alternatively, or in conjunction, the steps of the methods discussed may be stored as instructions in the form of software or firmware 42 located in memory 116 in the UE 123-127. These instructions may be executed by the processing unit 103 of the UE 123-127 in FIG. 10D.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other exemplary embodiments without departing from the spirit or scope of the invention. Thus, the present invention is not intended to be limited to the exemplary embodiments shown herein but is to be accorded the widest scope consistent with the principles and novel features disclosed herein. The present invention is not to be limited except in accordance with the following claims.

The invention claimed is:

1. An apparatus for transmitting information on a feedback channel, the apparatus comprising:
   a receiver configured to receive a signal on a primary channel;
   an update calculation module configured to determine an adjustment to be applied on the primary channel based on the received signal;
   an encode module configured to encode the adjustment to be applied using a variable-length prefix code, wherein a length and a bit value of the variable-length prefix code vary for different adjustments each of which includes a different phase adjustment, and wherein the length and the bit value of the variable-length prefix code are independent of a resolution of a phase adjustment associated with the variable-length prefix code; wherein the variable-length prefix code has a property that there is no valid codeword that is a prefix of any other valid variable-length prefix code; and
   a transmitter configured to transmit the encoded adjustment on the feedback channel.

2. The apparatus of claim 1, the receiver configured to receive a composite signal on a wireless channel from two antennas, the update calculation module comprising a phase update calculation module configured to compute a phase adjustment to be applied between the two antennas to optimize the quality of the composite signal, the encode module comprising a phase encode module configured to encode the phase adjustment, and the transmitter configured to transmit the encoded phase adjustment.

3. The apparatus of claim 1, the receiver configured to receive a composite signal on a wireless channel from two antennas, the update calculation module comprising a differential phase adjustment to be applied to a previously applied phase difference between the two antennas to optimize the quality of the composite signal, the encode module comprising a phase encode module configured to encode the differential phase adjustment, and the transmitter configured to transmit the encoded differential phase adjustment.

4. The apparatus of claim 2, the phase encode module configured to assign a codeword of the variable-length prefix code to a phase adjustment, the codewords non-uniformly quantizing a 360° range of possible phase adjustments.

5. The apparatus of claim 2, a first codeword of the variable-length prefix code encoding a first phase adjustment representing a quantization of a first angular step size, a second codeword of the variable-length prefix encoding a second phase adjustment representing a quantization of a second angular step size, the absolute value of the first phase adjustment being larger than the absolute value of the second phase adjustment, the length of the first codeword being not longer than the length of the second codeword.

6. The apparatus of claim 2, the transmitter configured to transmit codewords of the variable-length prefix code sequentially on the feedback channel.

7. The apparatus of claim 2, the feedback channel comprising successive slots of a frame, the transmitter configured to transmit two bits of a codeword of the variable-length prefix code in each slot.

8. The apparatus of claim 7, the frame being an up-link frame as defined according to the W-CDMA standard.

9. The apparatus of claim 1, the apparatus comprising a mobile station for a wireless communications system.

10. The apparatus of claim 2, the encode module further configured to encode, using the variable-length prefix code, a mode parameter signaling a quantization step size of the phase adjustment, and to transmit the encoded mode parameter on the feedback channel.

11. The apparatus of claim 1, the encode module further configured to transmit on the feedback channel an indication to change a codebook of the variable-length prefix code, and encoding the adjustment to be applied using the changed codebook.

12. The apparatus of claim 1, the receiver further configured to receive on the primary channel an indication to change a codebook of the variable-length prefix code, the encode module configured to encode the adjustment to be applied using the changed codebook.

13. The apparatus of claim 1, wherein the different adjustments include a first phase adjustment and a second phase adjustment, wherein a first variable-length prefix code having a first length relates to the first phase adjustment and a second variable-length prefix code having a second length relates to the second phase adjustment, wherein the first variable-length prefix code includes a first codeword having the first length and the second variable-length prefix code includes a second codeword having the second length, and wherein a concatenated sequence of the first codeword and the second codeword demarcates the individual first and second codewords without assistance of symbols.

14. A method for transmitting information on a feedback channel, the method comprising:
   receiving a signal on a primary channel;
   determining an adjustment to be applied on the primary channel based on the received signal;
   encoding the adjustment to be applied using a variable-length prefix code, wherein a length and a bit value of the variable-length prefix code vary for different adjustments each of which includes a different phase adjustment, and wherein the length and the bit value of the variable-length prefix code are independent of a resolution of a phase adjustment associated with the variable-length prefix code;
   wherein the variable-length prefix code has a property that there is no valid codeword that is a prefix of any other valid variable-length prefix code; and
   transmitting the encoded adjustment on the feedback channel.

15. The method of claim 14, the receiving the signal on the primary channel comprising receiving a composite signal on a wireless channel from two antennas, the determining the adjustment comprising computing a phase adjustment to be applied between the two antennas to optimize the quality of the composite signal, the encoding the adjustment comprising encoding the phase adjustment, and the transmitting the encoded signal comprising transmitting the encoded phase adjustment.

16. The method of claim 14, the receiving the signal on the primary channel comprising receiving a composite signal on a wireless channel from two antennas, the determining the adjustment comprising computing a differential phase adjustment to be applied to a previously applied phase difference between the two antennas to optimize the quality of the composite signal, the encoding the adjustment comprising encoding the differential phase adjustment, and the transmitting the encoded signal comprising transmitting the encoded differential phase adjustment.

17. The method of claim 15, the encoding the phase adjustment comprising assigning a codeword of the variable-length prefix code to a phase adjustment, the codewords non-uniformly quantizing a 360° range of possible phase adjustments.

18. The method of claim 15, a first codeword of the variable-length prefix code encoding a first phase adjustment representing a quantization of a first angular step size, a second codeword of the variable-length prefix encoding a second phase adjustment representing a quantization of a second angular step size, the absolute value of the first phase adjustment being larger than the absolute value of the second phase adjustment, the length of the first codeword being not longer than the length of the second codeword.

19. The method of claim 15, the transmitting the encoded adjustment comprising transmitting codewords of the variable-length prefix code sequentially on the feedback channel.

20. The method of claim 15, the feedback channel comprising successive slots of a frame, the transmitting comprising transmitting two bits of a codeword of the variable-length prefix code in each slot.

21. The method of claim 20, the frame being an up-link frame as defined according to the W-CDMA standard.

22. The method of claim 14, wherein the different adjustments include a first phase adjustment and a second phase adjustment, wherein a first variable-length prefix code having a first length relates to the first phase adjustment and a second variable-length prefix code having a second length relates to the second phase adjustment, wherein the first variable-length prefix code includes a first codeword having the first length and the second variable-length prefix code includes a second codeword having the second length, and wherein a concatenated sequence of the first codeword and the second codeword demarcates the individual first and second codewords without assistance of symbols.

23. An apparatus for transmitting information on a feedback channel, the apparatus comprising:

means for receiving a signal on a primary channel;
means for determining an adjustment to be applied on the primary channel based on the received signal;
means for encoding the adjustment to be applied using a variable-length prefix code, wherein a length and a bit value of the variable-length prefix code vary for different adjustments each of which includes a different phase adjustment, and wherein the length and the bit value of the variable-length prefix code are independent of a resolution of a phase adjustment associated with the variable-length prefix code; wherein the variable-length prefix code has a property that there is no valid codeword that is a prefix of any other valid variable-length prefix code; and
means for transmitting the encoded adjustment on the feedback channel.

24. The apparatus of claim 23, the means for encoding the adjustment to be applied comprising means for encoding the adjustment using a variable-length prefix code.

25. A computer program product for transmitting information on a feedback channel, the product comprising:
a non-transitory computer-readable medium comprising:
code for causing a computer to receive a signal on a primary channel;
code for causing a computer to determine an adjustment to be applied on the primary channel based on the received signal;
code for causing a computer to encode the adjustment to be applied using a variable-length prefix code, wherein a length and a bit value of the variable-length prefix code vary for different adjustments each of which includes a different phase adjustment, and wherein the length and the bit value of the variable-length prefix code are independent of a resolution of a phase adjustment associated with the variable-length prefix code; wherein the variable-length prefix code has a property that there is no valid codeword that is a prefix of any other valid variable-length prefix code; and
code for causing a computer to transmit the encoded adjustment on the feedback channel.

* * * * *